United States Patent
Cideciyan et al.

(10) Patent No.: US 9,251,846 B2
(45) Date of Patent: *Feb. 2, 2016

(54) TAPE HEADER PROTECTION SCHEME FOR USE IN A TAPE STORAGE SUBSYSTEM

(71) Applicant: GLOBALFOUNDRIES INC., Grand Cayman (KY)

(72) Inventors: Roy D. Cideciyan, Rueschlikon (CH); Robert A. Hutchins, Tucson, AZ (US); Thomas Mittelholzer, Zurich (CH); Keisuke Tanaka, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,591

(22) Filed: Dec. 2, 2014

(65) Prior Publication Data

US 2015/0085393 A1    Mar. 26, 2015

Related U.S. Application Data

(63) Continuation of application No. 13/909,973, filed on Jun. 4, 2013, now Pat. No. 8,929,014.

(51) Int. Cl.
*G11B 5/09* (2006.01)
*G11B 20/18* (2006.01)
*G11B 5/584* (2006.01)
(Continued)

(52) U.S. Cl.
CPC ............. *G11B 20/1833* (2013.01); *G11B 5/02* (2013.01); *G11B 5/09* (2013.01); *G11B 5/55* (2013.01); *G11B 5/584* (2013.01); *G11B 20/10009* (2013.01)

(58) Field of Classification Search
None
See application file for complete search history.

(56) References Cited

U.S. PATENT DOCUMENTS 6,615,387 B1   9/2003   Williamson et al.
7,716,556 B2   5/2010   Chen
(Continued)

FOREIGN PATENT DOCUMENTS

WO   WO2005069775 A2   8/2005
WO   WO2010079048 A1   7/2010

OTHER PUBLICATIONS

Keirn et al., "Use of Redundant Bits for Magnetic Recording: Single-Parity Codes and Reed-Solomon Error Correcting Code," 2004 IEEE, IEEE Transactions on Magnetics, vol. 40, No. 1, Jan. 2004, pp. 225-230.

(Continued)

*Primary Examiner* — Muhammad N Edun

(57) ABSTRACT

In one embodiment, a system for integrating data and header protection includes a processor and logic integrated with and/or executable by the processor, the logic being configured to receive a data array organized in rows and columns, each row of the data array comprising two or more interleaved C1 codewords (CWI), and modify one or more rows of the data array to include a header and error correction code (ECC) parity to form one or more modified rows, wherein each modified row includes two or more interleaved codewords, at least one codeword being a C1' codeword which includes ECC parity, wherein each header comprises a CWI Designation (CWID) which indicates a location of the CWI within the data array, and wherein none of the CWIDs are split across multiple C1' codewords in a single modified row. Other systems, methods, and computer program products are presented in additional embodiments.

20 Claims, 23 Drawing Sheets

(51) Int. Cl.
*G11B 5/55* (2006.01)
*G11B 5/02* (2006.01)
*G11B 20/10* (2006.01)

(56) References Cited

U.S. PATENT DOCUMENTS

| | | | |
|---|---|---|---|
| 7,876,516 B2 | 1/2011 | Cideciyan et al. | |
| 8,139,304 B2 | 3/2012 | Cideciyan et al. | |
| 8,144,414 B2 | 3/2012 | Cherubini et al. | |
| 8,929,014 B2* | 1/2015 | Cideciyan et al. | 360/48 |
| 2008/0184089 A1 | 7/2008 | Cideciyan et al. | |
| 2011/0252290 A1 | 10/2011 | Cideciyan et al. | |
| 2012/0033321 A1 | 2/2012 | Cideciyan et al. | |
| 2012/0036318 A1 | 2/2012 | Cideciyan et al. | |
| 2012/0210194 A1 | 8/2012 | Cideciyan et al. | |
| 2014/0355151 A1 | 12/2014 | Cideciyan et al. | |

OTHER PUBLICATIONS

Cideciyan et al., "Performance analysis of magnetic recording systems," 2001, pp. 1-5.

Cideciyan et al., "Perpendicular and Longitudinal Recording: A Signal-Processing and Coding Perspective," 2002 IEEE, IEEE Transactions on Magnetics, vol. 38, No. 4, Jul. 2002, pp. 1698-1704.

Non-Final Office Action from U.S. Appl. No. 13/909,973, dated Apr. 24, 2014.

Notice of Allowance from U.S. Appl. No. 13/909,973, dated Sep. 2, 2014.

U.S. Appl. No. 13/909,973, filed Jun. 4, 2013.

* cited by examiner

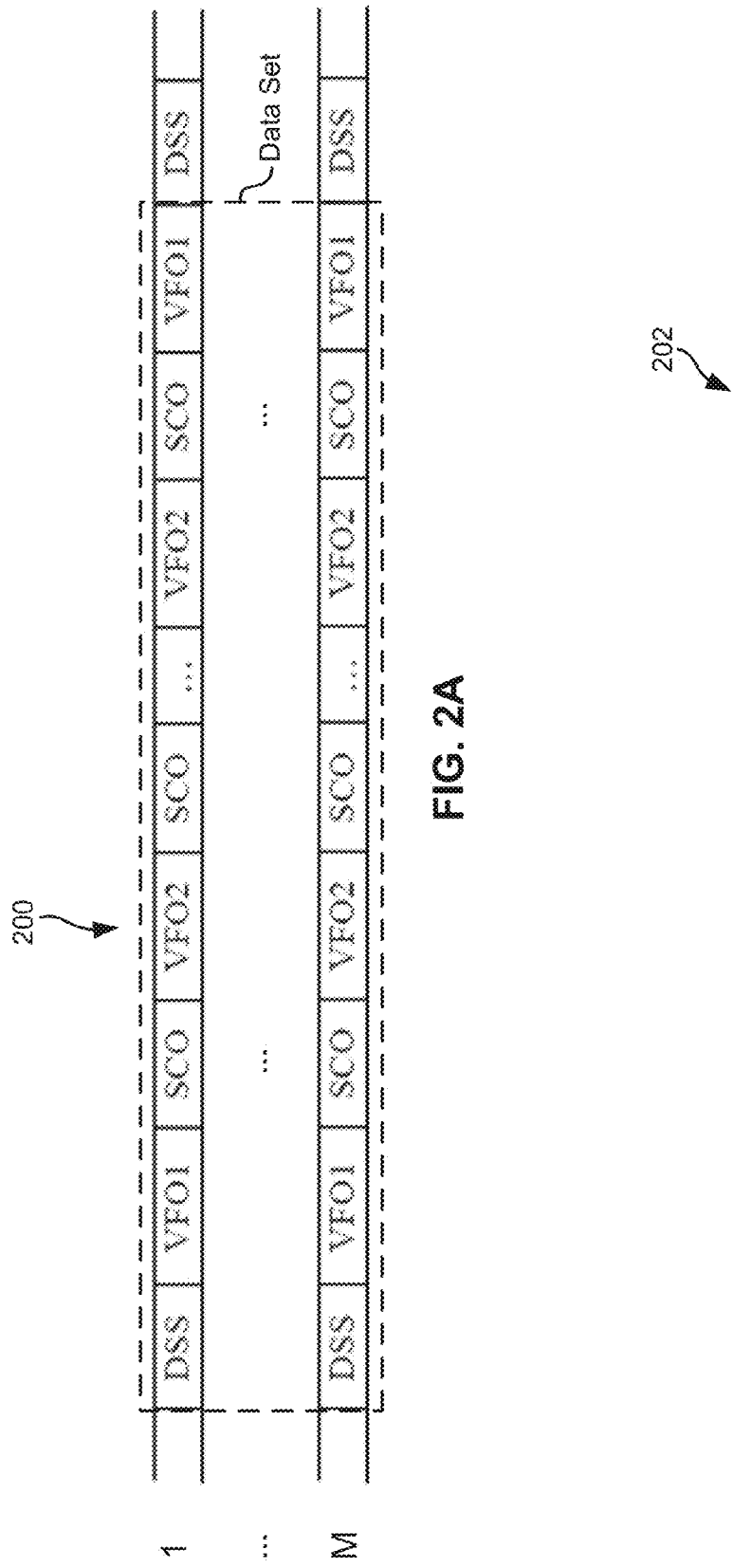

| Forward Sync | First CWI-4 | Resync | Second CWI-4 | Reverse Sync |

| Byte positions | Length in bytes | Name of the field |
|---|---|---|
| 0 | 6 | CWI-4 Identifier |
| 6 | 4 | Write Pass |
| 10 | 2 | Header Parity |

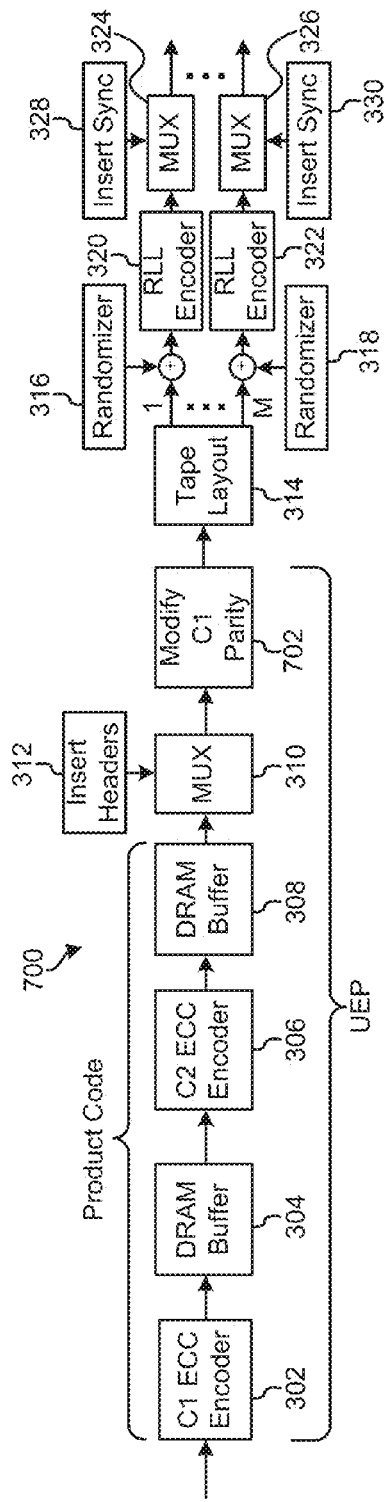
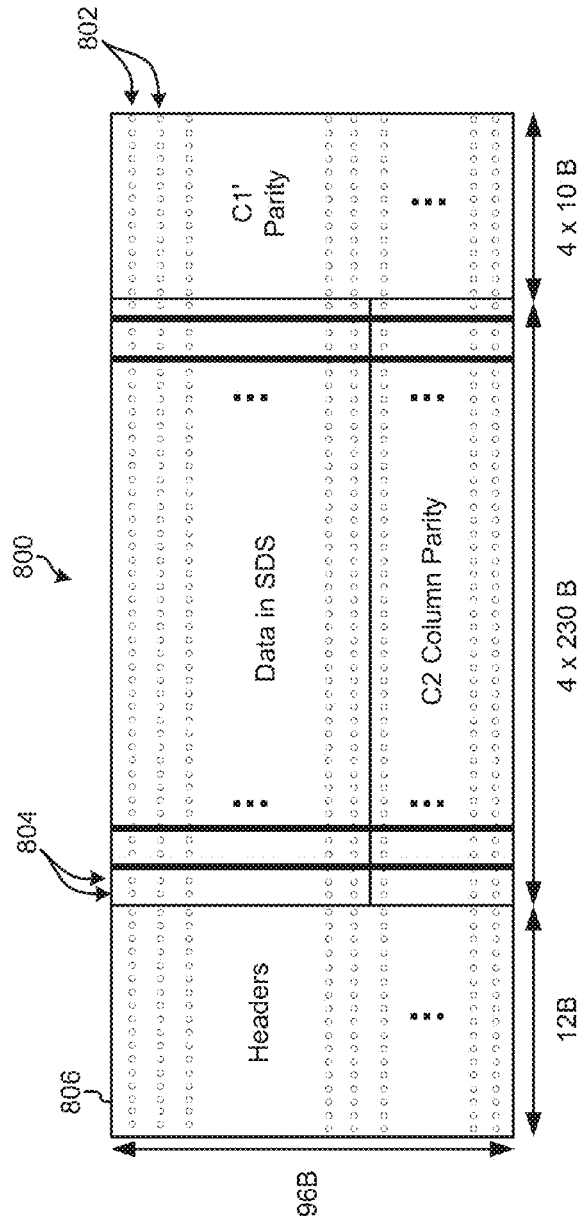
FIG. 7
FIG. 8

FIG. 20

| H0 | H1 | H4 | H5 |
|---|---|---|---|
| H6 | H2 | H8 | HA |
| H7 | H3 | H9 | HB |
| A3 | B3 | C3 | D3 |
| A4 | B4 | C4 | D4 |
| A5 | B5 | C5 | D5 |
| ... | ... | ... | ... |
| A236 | B236 | C236 | D236 |
| A237 | B237 | C237 | D237 |
| ... | ... | ... | ... |
| A247 | B247 | C247 | D247 |
| A248 | B248 | C248 | D248 |

2000

| H0 | H2 | H3 | A2 | A3 | A4 | ... | ... | A235 | A236 | | ... | ... | A246 | A247 |
|---|---|---|---|---|---|---|---|---|---|---|---|---|---|---|
| H1 | H6 | H7 | B0 | B1 | B2 | ... | ... | B233 | B234 | | ... | ... | B244 | B245 |
| H4 | H8 | H9 | C0 | C1 | C2 | ... | ... | C233 | C234 | | ... | ... | C244 | C245 |
| H5 | HA | HB | D2 | D3 | D4 | ... | ... | D235 | D236 | | ... | ... | D246 | D247 |

| H0 | H2 | H3 | A2 | A3 | A4 | ... | ... | A235 | A236 | ... | ... | A246 | A247 |
|----|----|----|----|----|----|-----|-----|------|------|-----|-----|------|------|
| H1 | H6 | H7 | B0 | B1 | B2 | ... | ... | B233 | B234 | ... | ... | B244 | B245 |
| H8 | H2'| H3'| C2 | C3 | C4 | ... | ... | C235 | C236 | ... | ... | C246 | C247 |
| H9 | HA | HB | D0 | D1 | D2 | ... | ... | D233 | D234 | ... | ... | D244 | D245 |

FIG. 22

| H0 | H1 | H2 | H3 | A2 | A3 | A4 | ... | ... | A235 | A236 | ... | ... | A246 | A247 |
|---|---|---|---|---|---|---|---|---|---|---|---|---|---|---|
| H6 | H7 | H2 | H3 | B2 | B3 | B4 | ... | ... | B235 | B236 | ... | ... | B246 | B247 |
| H8 | H9 | H2 | H3 | C2 | C3 | C4 | ... | ... | C235 | C236 | ... | ... | C246 | C247 |
| HA | HB | H2' | H3' | D2 | D3 | D4 | ... | ... | D235 | D236 | ... | ... | D246 | D247 |

| H6 | H0 | H1 | H2 | H3 | A2 | A3 | A4 | ⋮ | ⋮ | A235 | A236 | ⋮ | ⋮ | ⋮ | A246 | A247 |
|---|---|---|---|---|---|---|---|---|---|---|---|---|---|---|---|---|
| H7 | HA | HB | H2 | H3 | B2 | B3 | B4 | ⋮ | ⋮ | B235 | B236 | ⋮ | ⋮ | ⋮ | B246 | B247 |
| H8 | H4 | H5 | H2 | H3 | C2 | C3 | C4 | ⋮ | ⋮ | C235 | C236 | ⋮ | ⋮ | ⋮ | C246 | C247 |
| H9 | HA | HB | H2 | H3 | D2 | D3 | D4 | ⋮ | ⋮ | D235 | D236 | ⋮ | ⋮ | ⋮ | D246 | D247 |

TAPE HEADER PROTECTION SCHEME FOR USE IN A TAPE STORAGE SUBSYSTEM

RELATED APPLICATIONS

This application is a continuation of U.S. patent application Ser. No. 13/909,973, filed Jun. 4, 2013, which is herein incorporated by reference.

BACKGROUND

The present invention relates to data storage, and more particularly, to a tape header scheme for use in a tape storage subsystem.

In modern magnetic tape storage devices, data which is written on the tape is protected by one or more error correction code (ECC). For data correction, data which is read from the tape is conceptually arranged into a large matrix and is protected by two orthogonal error correcting codes, referred to typically as C1 and C2. The large data matrix is referred to as a sub data set (SDS). The C1 code is used to correct the rows of the SDS and the C2 code is used to correct the columns. This error correction methodology is very powerful. However, in order for this error correction methodology to work, the data has to be placed into the correct locations in the SDS. If the data's location cannot be determined, then the error correction methodology cannot be applied to this data. Therefore, the data location information is stored in a field called the header.

In one relatively new platform, a method of protecting the headers is implemented in order to provide more reliability as to the information stored in the headers. This method improves tape drive performance significantly over previous tape drive generations; however, this method does not provide the greatest of protection for the header information. Accordingly, a more reliable way to protect header information and to determine locations of data within a SDS would be very beneficial to reading data from magnetic tape.

BRIEF SUMMARY

In one embodiment, a system for integrating data and header protection includes a processor and logic integrated with and/or executable by the processor, the logic being configured to receive a data array organized in rows and columns, each row of the data array comprising two or more interleaved C1 codewords (CWI), and modify one or more rows of the data array to include a header and error correction code (ECC) parity to form one or more modified rows, wherein each modified row includes two or more interleaved codewords, at least one codeword being a C1' codeword which includes ECC parity, wherein each header comprises a CWI Designation (CWID) which indicates a location of the CWI within the data array, and wherein none of the CWIDs are split across multiple C1' codewords in a single modified row.

In another embodiment, a method for integrating data and header protection includes receiving a data array organized in rows and columns, each row of the data array comprising a CWI, modifying one or more rows of the data array to include a header and ECC parity to form one or more modified rows, wherein each modified row includes two or more interleaved codewords, at least one codeword being a C1' codeword which includes ECC parity, wherein each header comprises a CWID which indicates a location of the CWI within the data array, and wherein multiple copies of the CWID for each header are stored in a corresponding number of C1' codewords such that two or more C1' codewords comprise the CWID in a single modified row.

According to another embodiment, a computer program product for integrating data and header protection includes a computer readable storage medium having program code embodied therewith, the program code readable/executable by a storage device to receive a data array organized in rows and columns, each row of the data array comprising a CWI, and modify one or more rows of the data array to include a header and ECC parity to form one or more modified rows, wherein each modified row includes two or more interleaved codewords, at least one codeword being a C1' codeword which includes ECC parity, wherein each header comprises a CWID which indicates a location of the CWI within the data array, and wherein none of the CWIDs are split across multiple C1' codewords in a single modified row.

Other aspects and embodiments of the present invention will become apparent from the following detailed description, which, when taken in conjunction with the drawings, illustrates by way of example the principles of the invention.

BRIEF DESCRIPTION OF THE SEVERAL VIEWS OF THE DRAWINGS

FIGS. 2A-2D show various headers associated with a Code Word Interleave-4 (CWI-4).

FIG. 7 shows a system for encoding data, according to one embodiment.

FIG. 8 shows an encoded SDS unit, according to one embodiment.

FIG. 20 shows a CWI-4 layout according to one embodiment.

FIG. 21 shows a CWI-4 layout with unequal protection according to one embodiment.

FIG. 22 shows a CWI-4 layout with unequal protection according to another embodiment.

FIG. 23 shows another CWI-4 layout with duplicated header bytes according to one embodiment.

FIG. 24 shows a CWI-4 layout with duplicated header bytes according to a further embodiment.

DETAILED DESCRIPTION

Figure 1:
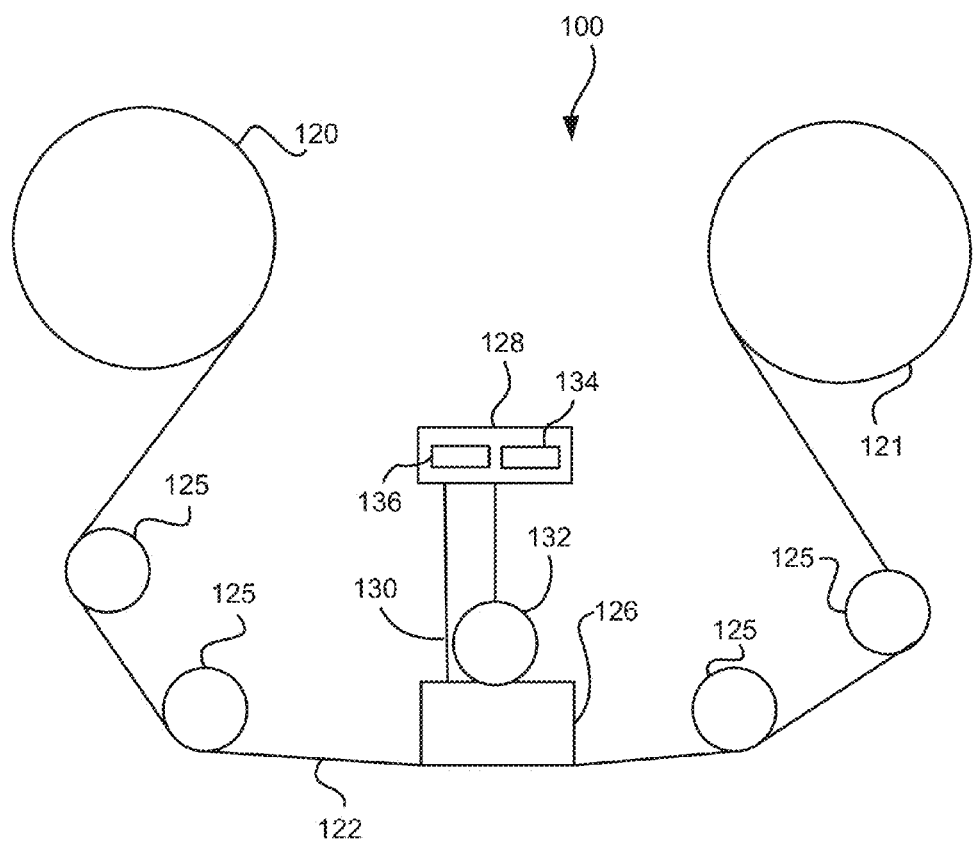
FIG. 1 illustrates a simplified tape drive of a tape-based data storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In the prior art, a fundamental data block written on each track is referred to as a Code Word Interleave-4 (CWI-4). "Code Word Interleave" refers to more than one (four in this case) Reed-Solomon (RS) codewords being interleaved when they are written onto magnetic tape. In one exemplary case, there are 234 bytes of data and 12 bytes of parity in a codeword. Each codeword may be used to correct up to six errors. In this exemplary case, the header is a 12-byte field that is placed at the beginning of four codewords. In order to protect the header, the header is broken into four interleaves of three bytes each. The parity for each RS codeword is calculated based upon the 234 bytes of data plus three header bytes, to form a RS(249,237) code. With this method, a certain number of errors in the header may be corrected. In prior generations of tape drives, this was not possible without using information from other CWI-4s.

In reality, the data location information (referred to as CWI-4 Designation herein) is stored in just two bytes of the header. Each of these bytes is assigned to a different RS codeword interleave. If an error occurs in the header, and an uncorrectable error occurs in either of the RS codewords that contain the CWI-4 Designation bits, then the entire CWI-4 is lost. This is because it will not be possible to correctly place the data within the SDS. Three codewords may be correct and not contain any errors, but since the CWI-4 Designation bits have been lost, they cannot be correctly placed within the SDS.

Accordingly, in one embodiment, to address the above described issue and add robustness to the tape subsystem, the parity for each RS codeword on the data is calculated along with the two CWI-4 designation bytes. This makes each RS codeword a stand-alone unit. If the codeword data is correctable, then enough information is obtained to place the data properly into the SDS. If only one codeword in a CWI-4 is correct, there is still enough information to place the data from this CWI-4 into the SDS.

In one general embodiment, a system for integrating data and header protection in tape recording includes a processor and logic integrated with and/or executable by the processor, the logic being adapted to: provide a data array organized in rows and columns, each row of the data array including four interleaved C1 codewords (CWI-4), add a header to each row of the data array, each header including a CWI-4 Designation (CWID) which indicates a location of the CWI-4 within the data array to form headerized rows, calculate ECC parity for at least one C1 codeword in each of the headerized rows, and modify the headerized rows to include the ECC parity to form modified rows, wherein each modified row includes four interleaved codewords, at least one codeword being a C1' codeword which includes ECC parity for a data portion of a C1 codeword and a portion of a header, and wherein none of the CWIDs are split across multiple C1' codewords in a single modified row.

In another general embodiment, a method for integrating data and header protection includes providing a data array organized in rows and columns, each row of the data array including four interleaved C1 codewords (CWI-4), adding a header to each row of the data array, each header including a CWID which indicates a location of the CWI-4 within the data array to form headerized rows, calculating ECC parity for at least one C1 codeword in each of the headerized rows, and modifying the headerized rows to include the ECC parity to form modified rows, wherein each modified row includes four interleaved codewords, at least one codeword being a C1' codeword, wherein at least a portion of each header is protected by at least one C1' codeword, and wherein multiple copies of the CWID for each header are stored in a corresponding number of C1' codewords such that two or more C1' codewords include the CWID in a single modified row.

According to another general embodiment, a computer program product for integrating data and header protection in tape recording includes a computer readable storage medium having program code embodied therewith, the program code readable/executable by the tape drive to: provide a data array organized in rows and columns, each row of the data array including four interleaved C1 codewords (CWI-4), add a header to each row of the data array, each header including a CWID which indicates a location of the CWI-4 within the data array to form headerized rows, calculate ECC parity for at least one C1 codeword in each of the headerized rows, and modify the headerized rows to include the ECC parity to form modified rows, wherein each modified row includes four interleaved codewords, at least one codeword being a C1' codeword which includes ECC parity for a data portion of a C1 codeword and a portion of a header, and wherein none of the CWIDs are split across multiple C1' codewords in a single modified row.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a simplified tape drive 100 of a tape-based data storage system, which may be employed according to various embodiments. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 1) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

An interface may also be provided for communication between the tape drive 100 and a host (integral or external) to send and receive the data and for controlling the operation of the tape drive 100 and communicating the status of the tape drive 100 to the host, as would be understood by one of skill in the art.

Error Correction Code (ECC) is used in data storage to achieve very low bit error rates, e.g., magnetic tape storage products are designed to ensure bit error rates in the range of $1 \times 10^{-17}$ to $1 \times 10^{-19}$ under normal operating conditions. Linear block codes, such as Reed-Solomon (RS) codes and low-density parity-check (LDPC) codes, have generally been preferred ECC schemes used in data storage products.

In FIG. 2A, a data set layout 200 having M tracks is shown where a sequence of synchronized codeword objects (SCO) are written in each track. Each data set starts with a data separating sequence field (DSS) and contains the various variable frequency oscillator fields (VFO1, VFO2) and SCO fields up to the next DSS field. FIG. 2B shows an SCO format 202 according to the prior art. In this layout, there are sixteen tracks (M=16), and a CWI-4 header is twelve bytes, with each codeword in a CWI-4 being 240 bytes, with 4 codewords being 960 bytes total. FIG. 2C shows another SCO format 204 according to the prior art. In this layout, there are thirty-two tracks (M=32) and the header is embedded in the CWI-4. Each codeword in a CWI-4 is 249 bytes, for a total for the four codewords in a CWI-4 of 996 bytes.

With reference to FIG. 2D, a 12-byte header 206 associated with a CWI-4 is shown in one embodiment. As shown, for bytes 0-11 (12 total bytes), the CWI-4 Identifier may be positioned at bytes 0-5 (6 bytes), the write pass at bytes 6-9 (4 bytes), and the header parity at bytes 10-11 (2 bytes). This is one embodiment of a layout for a CWI-4 header. Other possible byte distributions are also possible, as would be understood by one of skill in the art.

Figure 3:
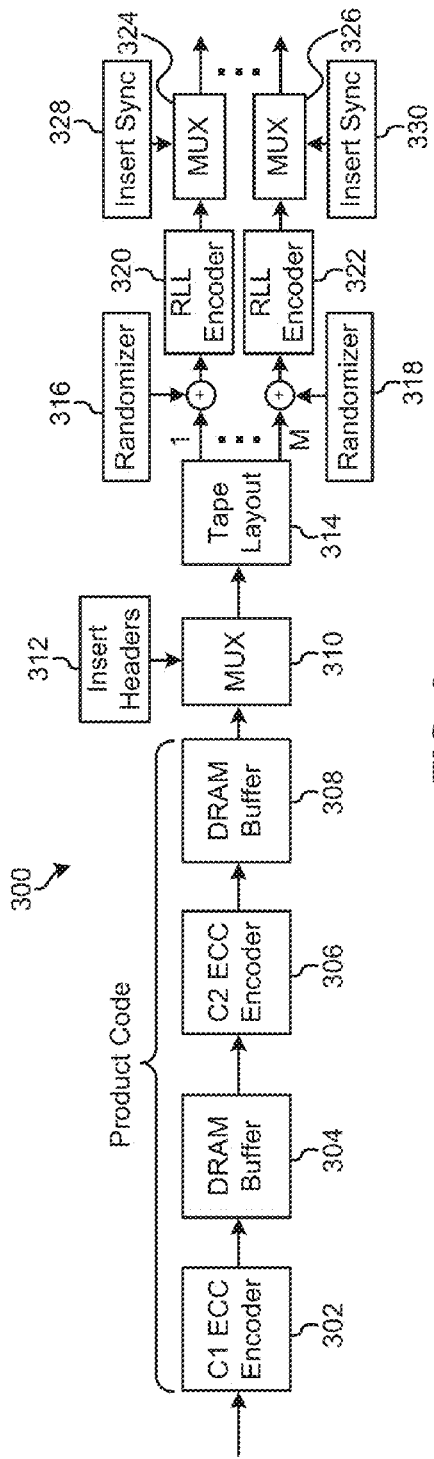
FIG. 3 shows a system for encoding data, according to one embodiment.

Now referring to FIG. 3, a system 300 for encoding data in a tape drive with M simultaneously written tracks is shown, including the operations of a C1 error correction code (ECC) encoder module 302, a DRAM buffer 304, C2 ECC encoder module 306, a second DRAM buffer 308 (which may be the same or different from DRAM buffer 304), a multiplexer 310 for adding headers 312 to encoded data, and tape layout addition module 314, according to one embodiment. The system 300 also includes scrambling (e.g., randomizers 1 to M adapted for data randomization in each channel) 316, ..., 318, run-length limited (RLL) encoder modules 320, ..., 322, individual channel multiplexers 324, ..., 326 for inserting synchronization 328, ..., 330 for each track 1, ..., M. Any number of tracks may be written to a magnetic medium, such as 4 tracks, 8 tracks, 16 tracks, 32 tracks, 64 tracks, etc. Furthermore, any type of storage medium may be used, such as magnetic tape, optical disk (such as CD-ROM, DVD-ROM, Blu-Ray, etc.), hard disk, etc.

In one approach, the storage medium may be a magnetic tape, and the system 300 may comprise logic adapted for parsing the encoded data into a plurality of tracks prior to writing the encoded data to the magnetic tape, such as the tape layout addition module 314, in one embodiment.

In FIG. 3, the C1 ECC encoder module 302, the DRAM buffer 304, the C2 ECC encoder module 306, and the second DRAM buffer 308 may be used for inserting a product code into sub data sets (SDS).

In the following descriptions, most of these operations are not shown to simplify description as the C1 parity and C2 parity in the ECC encoding are the focus of the descriptions. However, any of the descriptions herein may include additional operations not depicted, but described in other figures.

Figure 4:
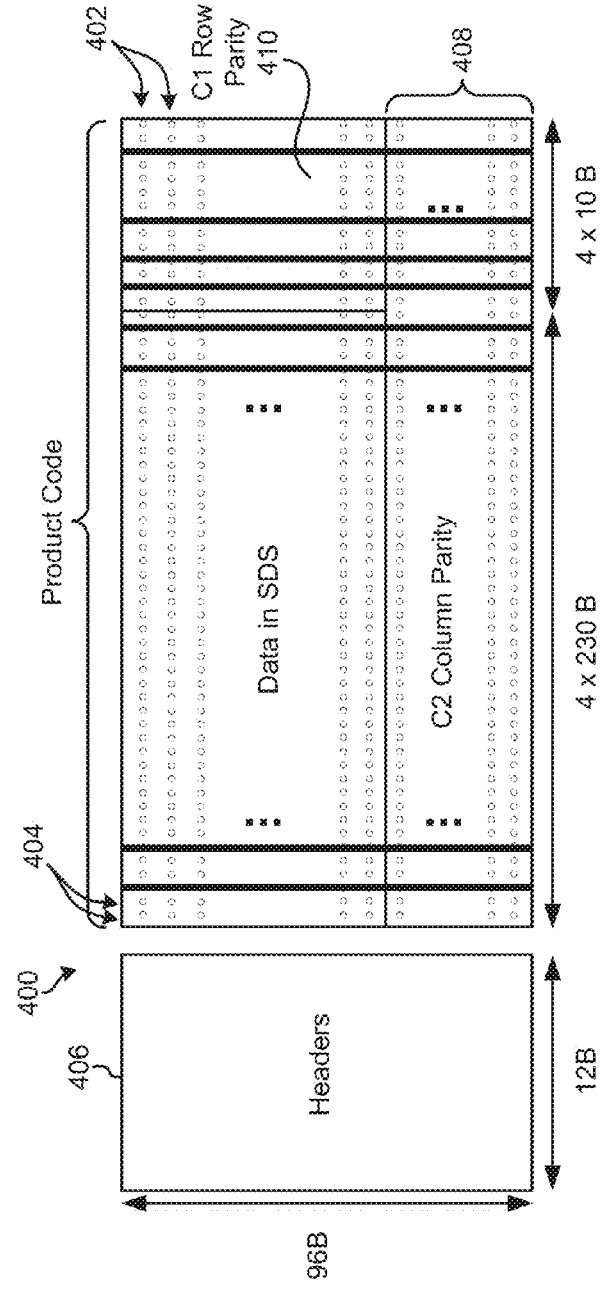
FIG. 4 shows an encoded sub data set (SDS) unit, according to one embodiment.

Each data set in the received data which is processed according to any embodiment described herein includes multiple subunits or SDS and each SDS is a two-dimensional array 400 shown in FIG. 4 with rows 402 and columns 404. Each row 402 in the array 400 comprises one or more C1 codewords, while each column 404 in the array 400 comprises one or more C2 codewords. In linear tape open (LTO), each encoded-SDS includes two (for generations LTO 1-LTO 4) or four (LTO 5 and later) C1 codewords in the rows 402. However, anywhere from one to eight or more C1 codewords may be included in each row 402 of the SDS array 400. Usually, hundreds or even thousands of headers 406 are assigned to a single data set because each data set includes multiple SDS and each row 402 of a column-encoded SDS is assigned a header (one row of the headers 406). FIG. 4 depicts 96 headers 406 that contain 12 bytes and are associated with the 96 rows 402 of the column-encoded SDS.

As shown in FIG. 4, since the C1 encoding takes place prior to the C2 ECC encoding, the C2 column parity 408 extends along the entire length of each row 402 in the C2 column parity portion of the array 400. The C1 row parity 410 is positioned at the end of each row 402 outside of the C2 column parity area 408 of the array 400. However, as indicated in FIG. 4 the dotted lines in the C2 column parity area 408 are C1 codewords. This is a property of the product code construction where the order of C1 and C2 extension may be interchanged without having an impact on the product code, i.e., all rows are from one code and all columns are from another code independent of the order of C1 and C2 extension. Therefore, the last 40 columns of the C2 column parity area 408 may be interpreted either as C1 parity or as C2 parity.

According to one embodiment, where each row 402 may include four C1 codewords interleaved into the entirety of the row 402, referred to as a CWI-4. Each C1 codeword may have 230 bytes of data, with the additional C1 parity adding an additional 10 bytes. Since four C1 codewords are interleaved in each row 402 in this embodiment, each row 402 (a row is one CWI-4) has 4×230 bytes+4×10 bytes=960 bytes. Furthermore, in this embodiment, there may be 96 rows 402 in each SDS array 400, or more or less rows 402 in other embodiments.

In addition, the headers 406, in one approach, may be 12 bytes long, with 96 rows 402 of headers 406 being present in this embodiment. This results in a total size of a SDS two-dimensional array 400 being 93,312 bytes, with no ECC encoding for the headers 406.

Furthermore, in one approach, the C1 ECC encoding scheme may comprise a RS(240,230,11) code over the Galois field GF(256), and the C2 ECC may comprise a RS(96,84,13) code over GF(256).

In more approaches, the length of a CWI-4 (984 bytes, each codeword being 246 bytes) and header (12 bytes) may be 996 bytes. In another approach, the length of a CWI-4 and header may be 1000 bytes, 1004 bytes, or some other value suitable for encoding the CWI-4 and header information with a desired level of protection.

Referring now to FIGS. 3-4, in one embodiment, a system 300 for encoding data may comprise logic adapted for receiving data comprising one or more SDS, a C1 ECC encoder module 302 adapted for generating a plurality of C1 codewords during C1 ECC encoding of the one or more SDS, each of the C1 codewords comprising a plurality of symbols. In some embodiments, the symbols may be bytes (8-bit symbols where the bits take values 0 or 1), although other symbols may be used in other embodiments. The system 300 may also include logic adapted for interleaving the plurality of C1 codewords into C1 codeword interleaves (CWIs), such as the multiplexer 310. Each CWI has a predetermined number of C1 codewords interleaved therein, and as shown in FIG. 4, there are four C1 codewords interleaved in each row (CWI-4) 402, but any number of codewords may be interleaved, such as two, six, eight, ten, etc.

In order to interleave C1 codewords into each row 402, what happens is that a first byte of each codeword is placed in the row, followed by the second byte of each codeword, followed by the third byte of each codeword, and each subsequent byte from each codeword interleaved together so that all codewords' first bytes are together, all second bytes, all third bytes, ..., and then all last bytes of each of the codewords. In one embodiment, the positioning of the interleaves is different across different rows 402 in the array 400 so that the bits from the first interleave are not always in a column 404 together.

In other words, the logic adapted for interleaving the plurality of C1 codewords into the CWIs 402 comprises logic adapted for byte-interleaving a same number of C1 codewords together into each CWI 402. The number of C1 codewords interleaved together may range from two to eight C1 codewords or more.

The tape layout interleaves C2 and C1 codewords and thus decorrelates byte errors at the C2 decoder input. In one approach, a 6 MB encoded data set (DS) may include 64 SDS which are the basic ECC data units each containing 96*996 bytes. The tape layout also associates headers to SDS rows (~1 kB packet) and assigns each packet to one of the logical tracks, e.g., to one of 32 logical tracks. An error rate of less than $1 \times 10^{-3}$ at the C2 decoder input translates to an error rate of less than $1 \times 10^{-17}$ at the C2 decoder output. A 32-track tape layout design has good decorrelation properties. An improved decorrelation due to a 50% increase over the LTO-5 minimum packet spacing is possible with embodiments described herein.

The system 300 also includes a C2 encoder module 306 adapted for generating a plurality of C2 codewords during C2

ECC encoding of the one or more SDS, each of the C2 codewords comprising a plurality of symbols. The C2 codewords are represented by columns 404 in the array 400, with each column 404 including a portion of one, exactly one, or more C2 codewords, according to various embodiments. However, in this embodiment, each C2 codeword has at most one symbol from each C1 codeword in each CWI (each row 402) and each column 404 is exactly one C2 codeword.

Also, the system 300 comprises logic adapted for writing the one or more encoded SDS to the storage medium. This logic may be included in the tape layout addition module 314, randomizers 316, 318, RLL encoders 320, 322, multiplexers 324, 326, and sync pattern insertion 328, 330, in one approach.

In system 300, the C1 ECC encoding is performed prior to the C2 ECC encoding, which results in SDS encoding as shown in FIG. 4, according to one embodiment.

Figure 5:
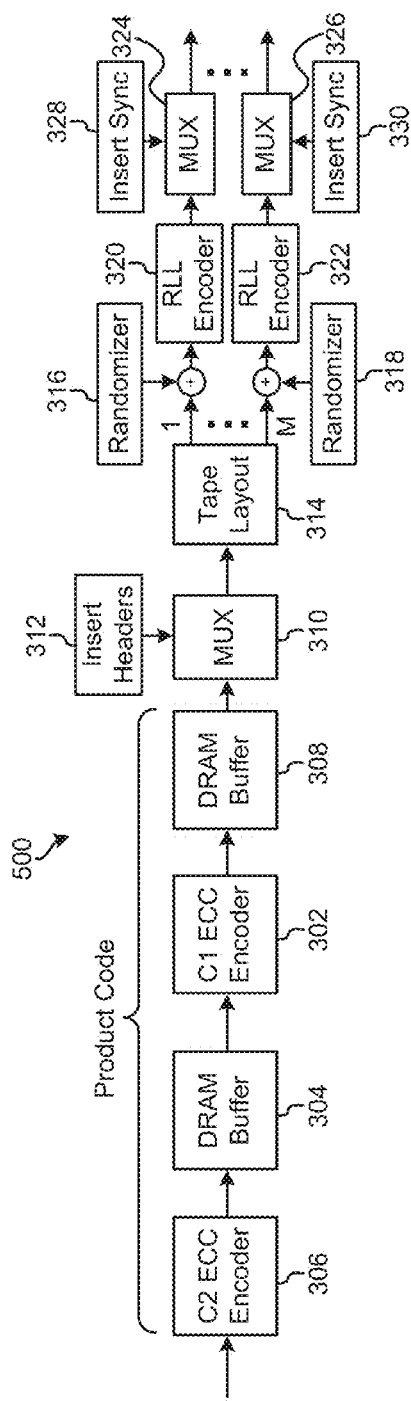
FIG. 5 shows a system for encoding data, according to one embodiment.
Figure 6:
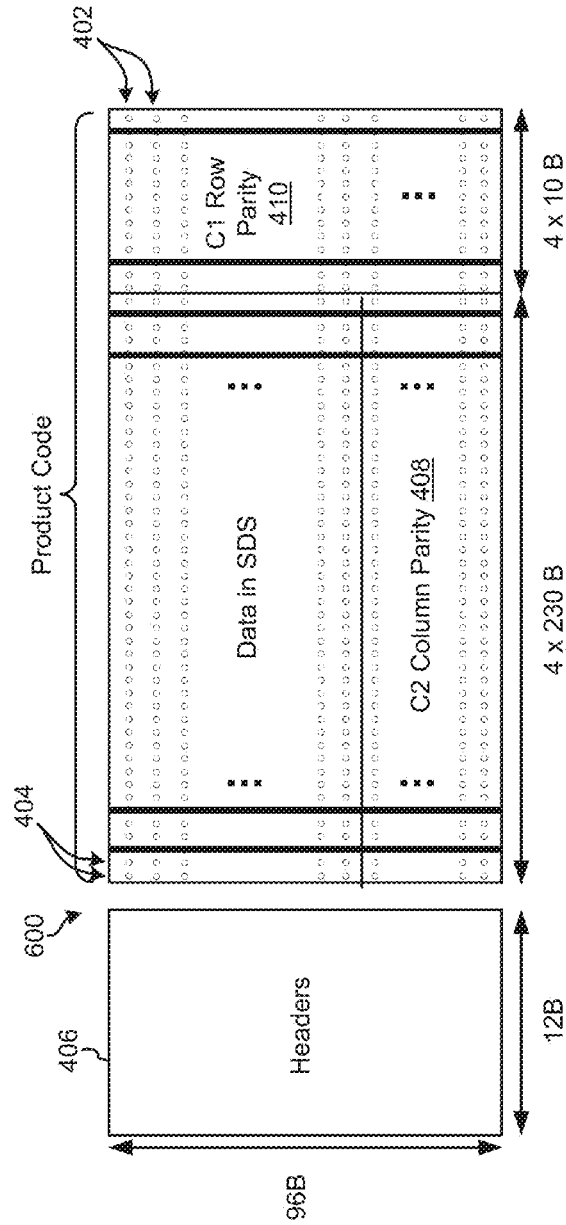
FIG. 6 shows an encoded SDS unit, according to one embodiment.

According to another embodiment, as shown in FIGS. 5-6, a system 500 may have the C2 ECC encoding (using the C2 ECC encoder module 306) performed prior to the C1 ECC encoding (using the C1 ECC encoder module 302), which results in SDS encoding as shown in FIG. 6, according to one embodiment. Although C2 encoding is performed first, the columns in the C1 row parity area 410 in FIG. 6 are C2 codewords indicated by solid vertical lines in the C1 row parity area 410. This is a property of product code construction.

However, just as in array 400 in FIG. 4, array 600 in FIG. 6 has headers 406 that are not encoded.

In this embodiment, it is possible to also have a C2 encoder module 306 adapted for generating a plurality of C2 codewords during C2 ECC encoding of the one or more SDS. The C2 codewords are represented by columns 404 in the array 600, with each column 404 including a portion of one, exactly one, or more C2 codewords, according to various embodiments. However, in this embodiment, each C2 codeword has at most one symbol from each C1 codeword in each CWI (each row 402) and each column 404 is exactly one C2 codeword.

Furthermore, in one approach, the C1 ECC encoding scheme may comprise a RS(240,230,11) code over GF(256), and the C2 ECC may comprise a RS(96,84,13) code over GF(256).

According to another embodiment, as shown in FIGS. 7-8, a system 700 may include all modules and logic that is present in FIG. 3, described previously. However, in the embodiment shown in FIGS. 7-8, the headers 806 may be encoded using a C1 encoding scheme by modifying the C1 row parity to account for the headers 806 using a C1 parity modifying module 702. This may be referred to as a concatenated code with unequal error protection (UEP). In this embodiment, the headers are protected by one-level ECC whereas the data is protected by two-level ECC.

In other words, the system 700 may also include logic adapted for adding a header 806 to each of the one or more SDS, and logic adapted for modifying the plurality of C1 codewords to account for inclusion of the headers.

In this embodiment, each header 806 includes encoding, which adds 12 bytes to each of the CWI. When four codewords are included in each row 802, 3 bytes are added to each of the four C1 codewords in a CWI.

However, just as in the previous embodiments, each C2 codeword has at most one symbol from each C1 codeword in each CWI (each row 802) and each column 804 is exactly one C2 codeword.

Figure 9:
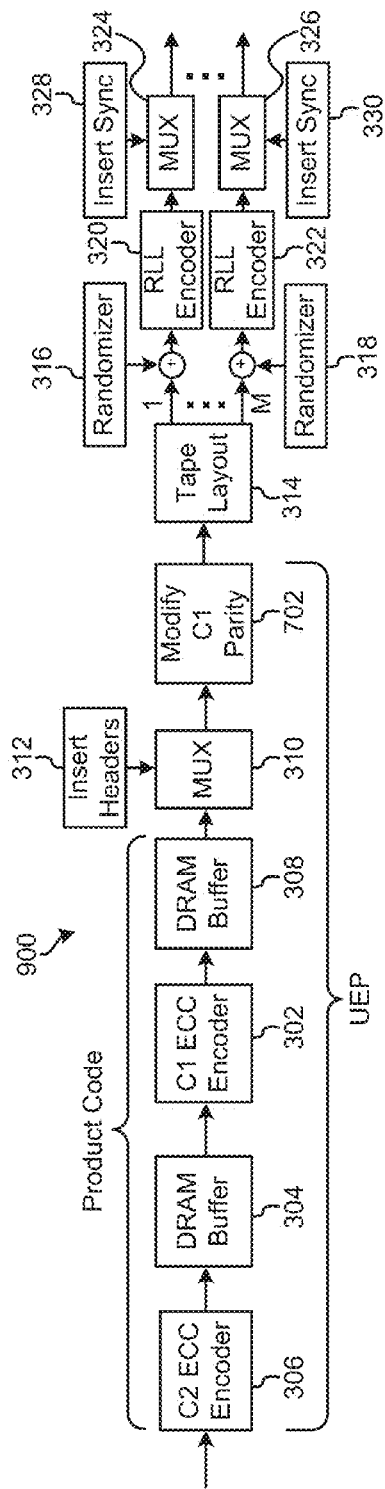
FIG. 9 shows a system for encoding data, according to one embodiment.
Figure 10:
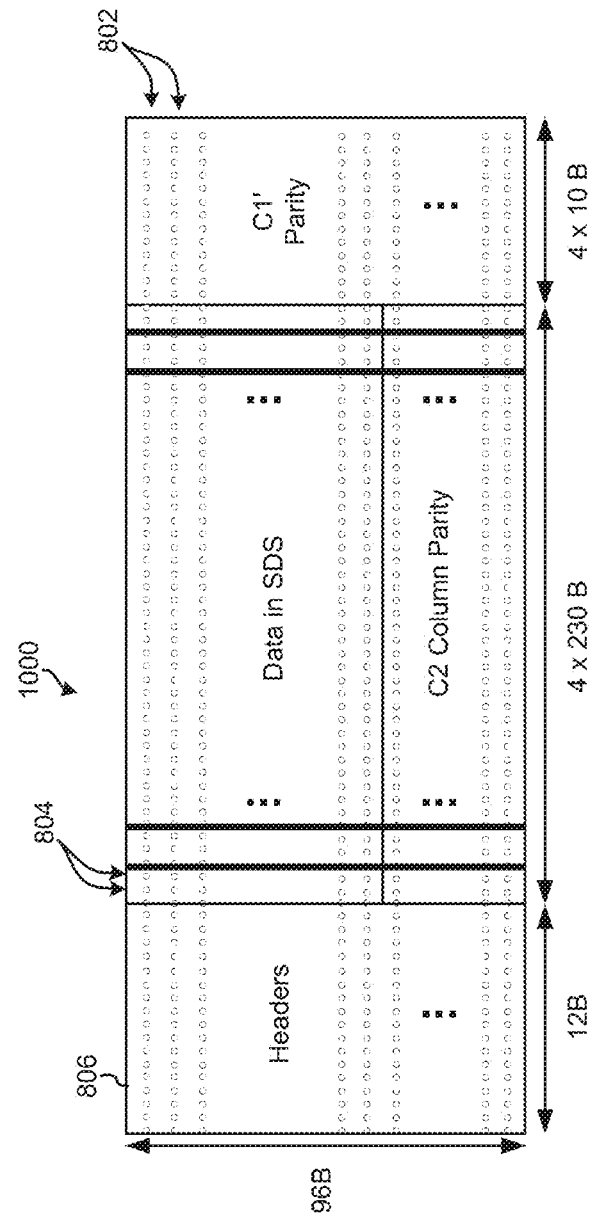
FIG. 10 shows an encoded SDS unit, according to one embodiment.

Now referring to FIGS. 9-10, a system 900 may include all modules and logic that is present in FIG. 5, described previously. However, in the embodiment shown in FIGS. 9-10, the headers 806 may be encoded using a C1 encoding scheme by modifying the C1 row parity to account for the headers 806 using a C1 parity modifying module 702. This may be referred to as a concatenated code with UEP. In this embodiment, the headers are protected by one-level ECC whereas the data is protected by two-level ECC.

In other words, the system 900 may also include logic adapted for adding headers 806 to each of the one or more SDS, and logic adapted for modifying the plurality of C1 codewords to account for inclusion of the headers.

In this embodiment, the C2 column parity do not extend across the entirety of the array 1000, as the modified C1 row parity exists in each row 802 of the array 1000. Furthermore, each header 806 includes encoding, which adds 12 bytes to each of the CWI. When four codewords are included in each row 802, 3 bytes are added to each of the C1 codewords.

However, just as in the previous embodiments, each C2 codeword has at most one symbol from each C1 codeword in each CWI (each row 802) and each column 804 is exactly one C2 codeword.

Figure 11A:
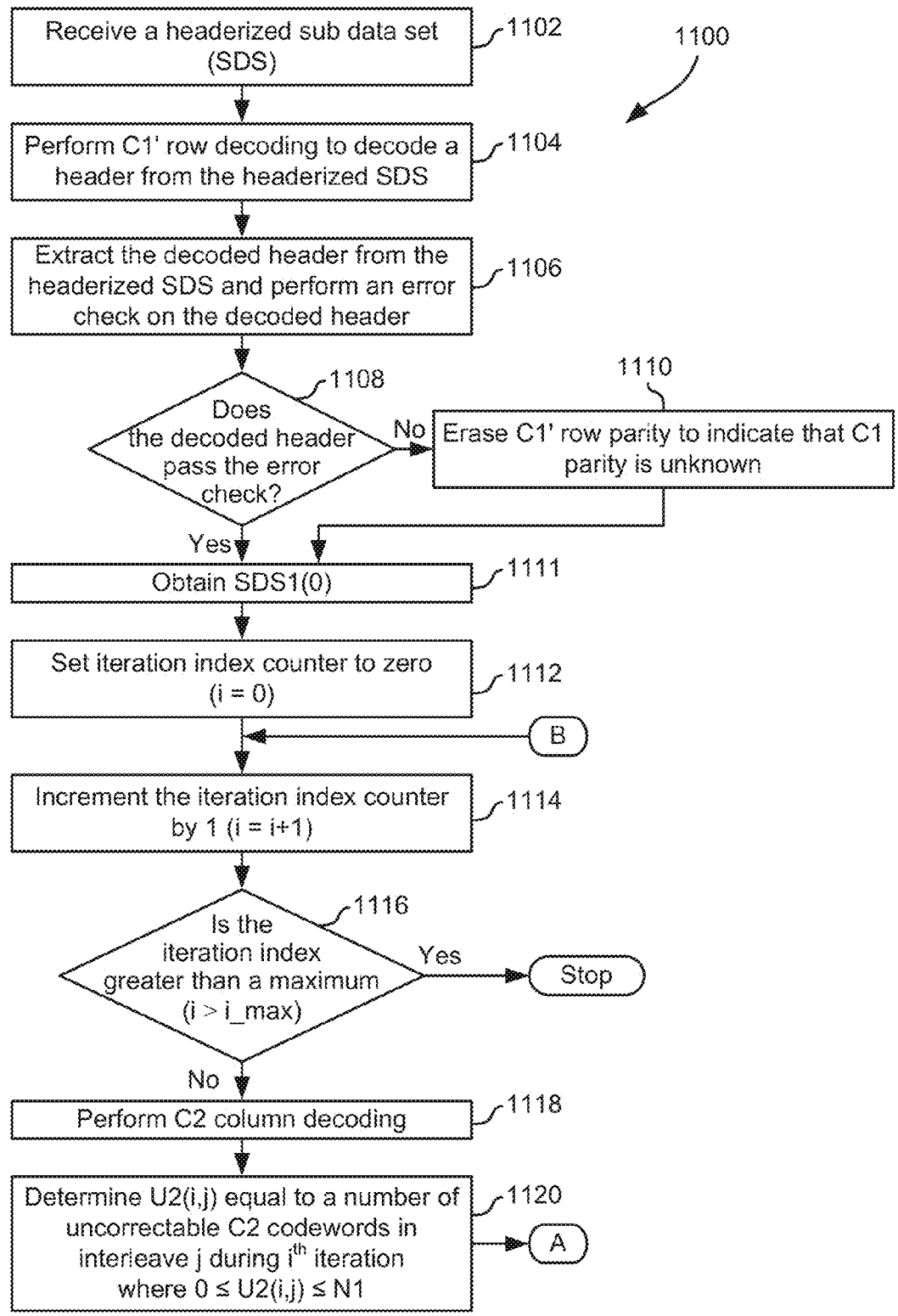
FIGS. 11A-11B show a flowchart of a method, according to one embodiment.
Figure 11B:
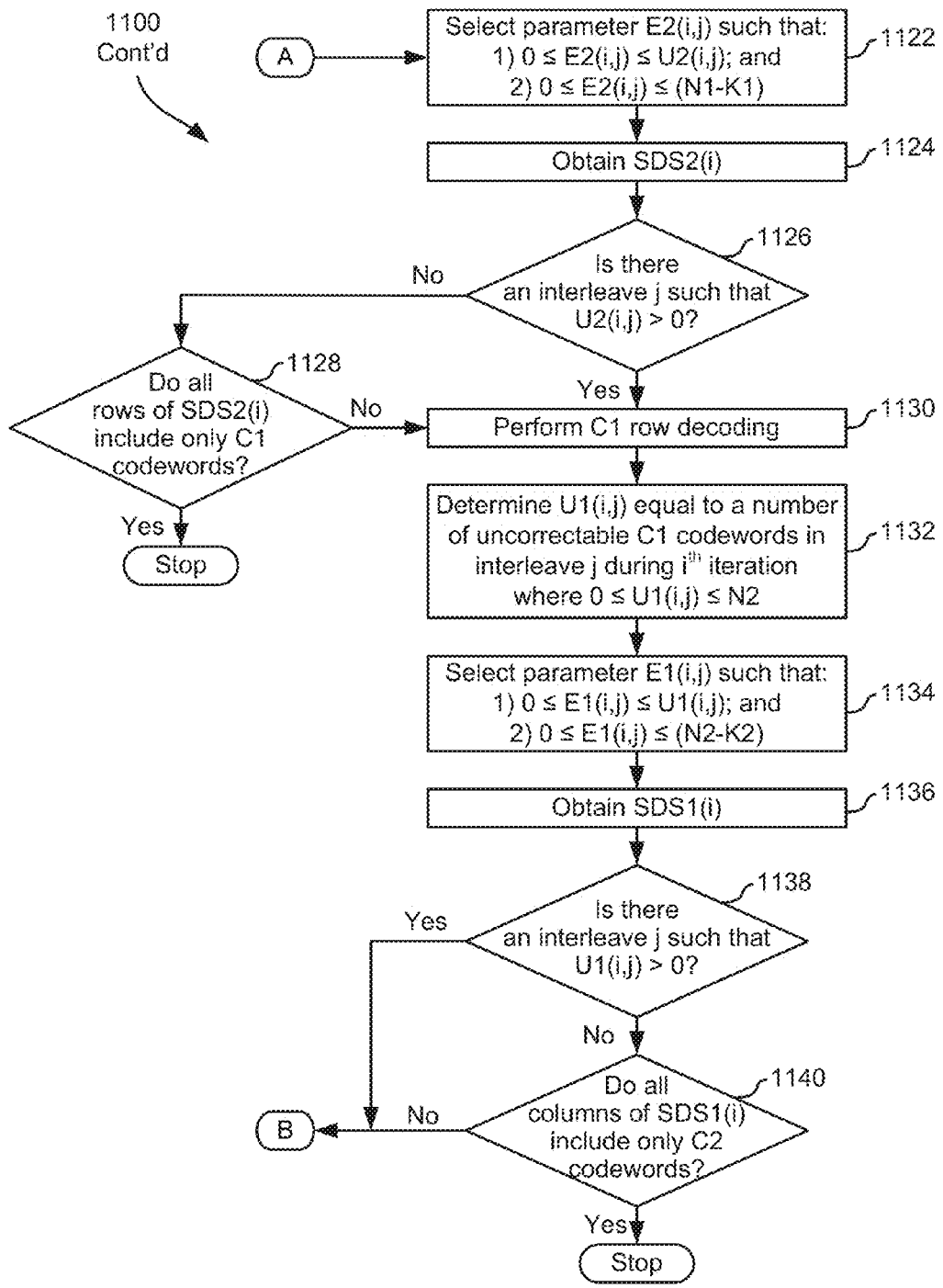

Now referring to FIG. 11, a method 1100 for decoding a SDS is shown according to one embodiment. The method 1100 may be performed in accordance with the present invention in any of the environments depicted in FIGS. 1-10 and 12-14, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various non-limiting embodiments, the method 1100 may be partially or entirely performed by a C1/C2 encoding/decoding system, a tape drive, a hard disk drive, an optical drive, a processor (such as a CPU, an ASIC, a FPGA, etc.) which may be embedded in and/or operate within a system, etc.

As shown in FIG. 11, method 1100 may initiate with operation 1102, where a headerized SDS protected by unequal error protection is received. A header of the headerized SDS is protected by one level of ECC and data of the headerized SDS is protected by two levels of ECC.

In operation 1104, a header is decoded from the headerized SDS and an impact of the decoded header is removed from C1 row parity, in order to obtain a SDS.

In operation 1106, the decoded header is extracted from the headerized SDS to obtain a SDS1(0) and an error check, such as a cyclic redundancy check (CRC), is performed on the decoded header.

In operation 1108, it is determined whether the decoded header passes the error check. If so, the method 1100 continues to operations 1111 and 1112; otherwise, operation 1110.

In operation 1110, the C1' row parity is erased to indicate that C1 row parity is unknown when the decoded header fails the error check. Strictly speaking, C1 codewords do not include header fragments, whereas C1' codewords include header fragments. In other words, if the C1 code is (N1, K1) code and a header contains H symbols (e.g., H bytes) and there are j_max interleaves in an SDS row, C1' code is (N1+H/j_max, K1+H/j_max). In this text, C1 code is sometimes used for C1' code. However, from the context of the code described, it should be clear which code is meant.

For example, assume R headers in a received SDS are recovered and Q=N2−R headers in the SDS are not recovered. The received initial SDS is referred to as SDS2(0). Moreover, among Q non-recovered headers, there are P decoded CWI-4 designations, where $0 \leq P \leq Q$, that indicate the position of a SDS row within the data set, i.e., although Q headers could not be recovered, P header parts were able to be recovered that indicate the position of these P SDS rows within the data set. Following C1' decoding, a parameter E'(j) may then be selected such that: 1) $0 \leq E'(j) \leq U'(j)$, and 2) $0 \leq E'(j)+(Q-P) \leq (N2-K2)$ are satisfied, where U'(j) is a number of uncorrectable C1' codewords in interleave j (j=1, 2, 3, 4 is a preferred choice indicating four interleaves).

In operation 1111, SDS1(0) is obtained. In one embodiment, SDS1(0) may be obtained according to the following description.

According to one embodiment, SDS1(0) is obtained from the received SDS2(0) by iteratively, for $1 \leq j \leq j\_max$ iterations, where j_max is a maximum number of interleaves: overwriting N2-U'(j) rows of received SDS2(0,j) with successfully decoded C1' codewords; erasing E'(j) C1' codewords out of a total of U'(j) uncorrectable C1' codewords in SDS2(0,j); maintaining U'(j)-E'(j) C1' codewords in SDS2(0,j) uncorrected; and combining each interleave of modified SDS2(0,j) to form SDS1(0).

In operation 1112, an iteration index counter, i, is set to zero in order to begin iterative processing.

In operation 1114, the iteration index counter is incremented by 1, e.g., i=i+1.

In operation 1116, it is determined whether the iteration index counter, i, is greater than a maximum number of iterations, i_max, e.g., i>i_max. If the iteration index counter, i, is greater than the maximum number of iterations, i_max, the method 1100 is stopped, and an indication that the headerized SDS cannot be decoded properly is output. Otherwise, the method 1100 continues to operation 1118.

In operation 1118, C2 column decoding is performed on the SDS1(i-1).

In operation 1120, a number of uncorrectable C2 codewords in the current interleave j is determined, where the number of uncorrectable C2 codewords is U2(i,j), with $0 \leq U2(i,j) \leq N1$, where N is a total number of symbols in a C1 codeword.

In operation 1122, a first parameter E2(i,j) is selected, where i is the iteration index counter and j is a current interleave in a row, such that $0 \leq E2(i,j) \leq U2(i,j)$ and $0 \leq E2(i,j) \leq (N1-K1)$. U2(i,j) is the number of uncorrectable C2 codewords in the current interleave j, and K1 is a number of data symbols in a C1 codeword.

In operation 1124, SDS2(i) is obtained. According to one embodiment, SDS2(i) is obtained from SDS1(i-1) by iteratively, for $1 \leq j \leq j\_max$ iterations, where j_max is a maximum number of interleaves: overwriting N1-U2(i,j) columns of SDS (i-1,j) with successfully decoded C2 codewords, where SDS1(i-1,j) is a first calculated SDS for interleave j; erasing E2(i,j) C2 codewords out of a total of U2(i,j) C2 codewords in SDS1(i-1,j); maintaining U2(i,j)-E2(i,j) C2 codewords in SDS1(i-1,j) uncorrected; and combining each interleave of the overwritten and erased SDS1(i-1,j) to form SDS2(i).

In operation 1126, it is determined whether an interleave j exists where U2(i,j)>0. If so, the method 1100 continues to operation 1130; otherwise. U2(i,j)=0 for $1 \leq j \leq j\_max$ and the method 1100 continues to operation 1128.

In operation 1128, it is determined whether all rows of SDS2(i) include only C1 codewords. More than one C1 codeword may be included in each row, e.g., four C1 codewords in a CWI-4, i.e., j_max=4. All columns of SDS2(i) include only C2 codewords because U2(i,j)=0 for $1 \leq j \leq j\_max$. If so, a decoded SDS, SDS2(i), is output and the method 1100 ends; otherwise, the method 1100 continues to operation 1130.

In operation 1130, C1 row decoding is performed on SDS2 (i).

In operation 1132, a number of uncorrectable C1 codewords in the current interleave, j, is determined, where the number of uncorrectable C1 codewords is U1(i,j), with $0 \leq U1(i,j) \leq N2$, where N2 is a total number of symbols in a column.

In operation 1134, a second parameter E1(i,j) is selected such that $0 \leq E1(i,j) \leq U1(i,j)$ and $0 \leq E1(i,j) \leq (N2-K2)$, where K2 is a number of data symbols in a column.

In operation 1136, SDS1(i) is obtained. In one embodiment, SDS1(i) is obtained from SDS2(i) by iteratively, for $1 \leq j \leq j\_max$ iterations, where j_max is a maximum number of interleaves: overwriting N2-U1(i,j) rows of SDS2(i,j) with successfully decoded C1 codewords, where SDS2(i,j) is a second calculated SDS for interleave j; erasing E1(i,j) C1 codewords out of a total of U1(i,j) C1 codewords in SDS2(i,j); maintaining U1(i,j)-E1(i,j) C1 codewords in SDS2(i,j) uncorrected; combining each interleave of overwritten and erased SDS2(i,j) to form SDS1(i).

In operation 1138, it is determined whether an interleave exists where U1(i,j)>0. If so, the method 1100 returns to operation 1114; otherwise, the method 1100 continues to operation 1140.

In operation 1140, all rows of SDS1(i) consist of C1 codewords because U1(i,j)=0 for $1 \leq j \leq j\_max$. Therefore, it is only determined whether all columns of SDS1(i) are C2 codewords. If so, a decoded SDS, SDS1(i), is output and the method 1100 ends; otherwise, the method 1100 returns to operation 1114.

In one embodiment, the header of the headerized SDS may be protected by C1 encoding and data of the headerized SDS may be protected by C1 encoding and C2 encoding.

It should also be noted that, in some alternative implementations, the functions noted in the block may occur out of the order noted in the figures. For example, two blocks shown in succession may, in fact, be executed substantially concurrently, or the blocks may sometimes be executed in a reverse order, depending upon the functionality involved. For example, in another embodiment, after first performing C1' decoding, removing header impact and C2 decoding with E'(j)=U'(j), a valid SDS may not be obtained. If so, instead of performing C1 decoding, it may be more beneficial to again perform C2 decoding with a SDS1(0) generated assuming E'(j)=0, and then continue by C1 decoding and C2 decoding iteratively.

According to various embodiments, the method 1100 may be performed by a system via logic executing each operation, by a computer program product, or by some other device or system. The computer program product may include a computer readable storage medium having program code embodied therewith, and the program code may be readable/executable by a tape drive to cause the method 1100 to be performed.

Figure 12:
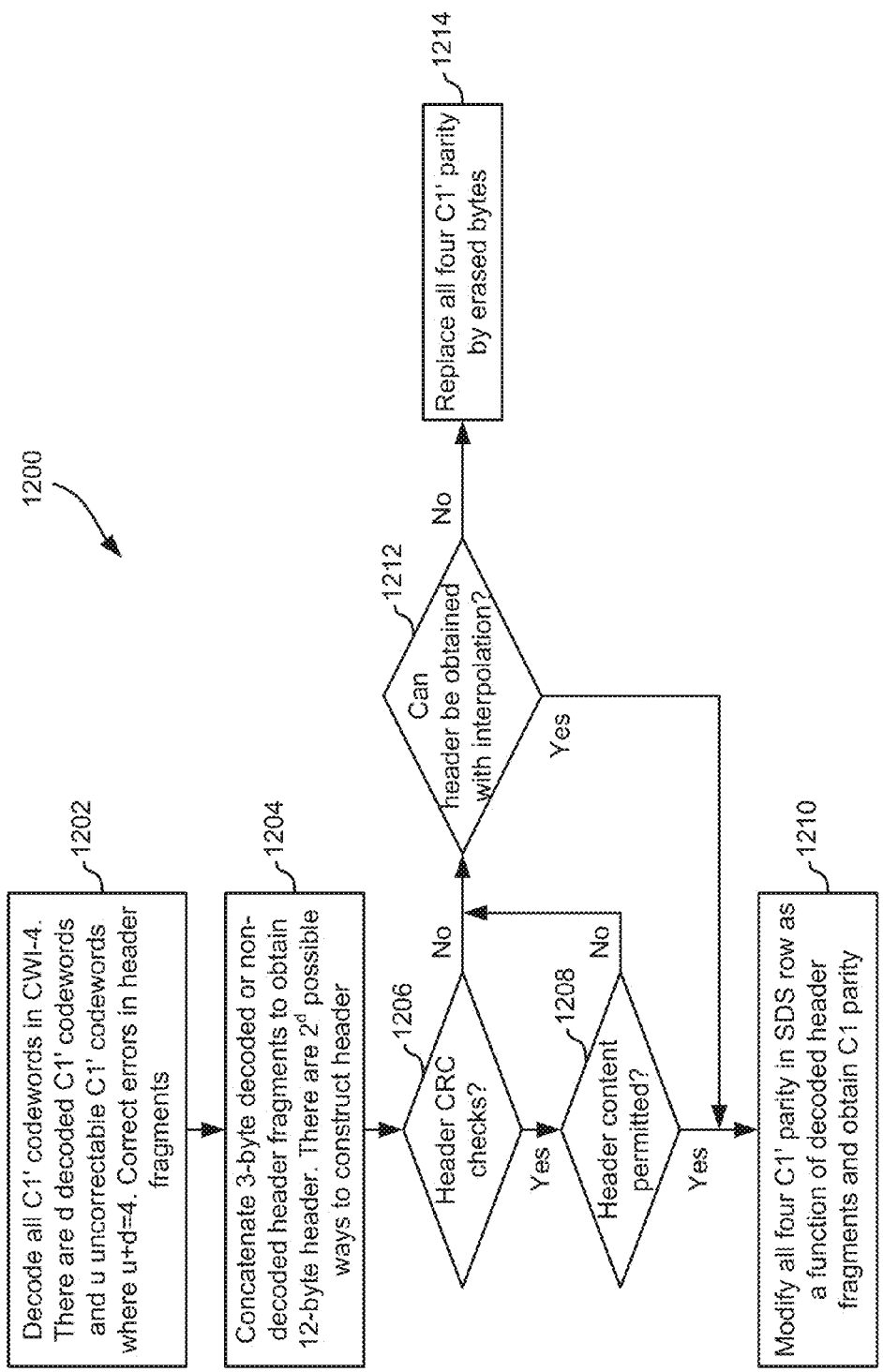
FIG. 12 is a flowchart of a method according to one embodiment.

Now referring to FIG. 12, a method 1200, which may be a more detailed description of operations 1104-1110, is shown according to one embodiment. The method 1200 may be used to extract a header from an unequally protected headerized SDS, in one approach. The method 1200 begins with operation 1202, where all C1' codewords in a given interleave (in this example a four codeword interleave, CWI-4) are decoded. There are d decoded C1' codewords and u uncorrectable C1' codewords, where u+d=4. Any errors in the header fragments are corrected. Of course, in other uses, any number of codeword interleaves may be used.

In operation 1204, in this example, 3-byte decoded or non-decoded header fragments are concatenated to obtain a single 12-byte header. There are $2^d$ possible ways to construct the header. Of course, in other uses, any size of header and/or byte fragments may be used.

In operation 1206, it is determined whether the header passes a CRC check. If so, the method continues to operation 1208; otherwise, the method 1200 continues to operation 1212.

If there are uncorrectable C1' codewords, they can be left uncorrected for the purpose of extracting the header. If header CRC checks, then C1' parity in that row may be modified as that header is assumed to be correct and thus its impact on C1' parity may be removed in operation 1210.

In operation 1208, it is determined whether content of the header is permitted, using any passes a CRC check. If so, the method continues to operation 1210; otherwise, the method 1200 continues to operation 1212.

In operation 1210, if the header with correct CRC was obtained in a particular SDS row, C1' parity may be modified by removing the impact of the header on C1' parity to obtain C1 parity.

In addition, header interpolation, as in legacy tape drives, may be used to obtain the header. Note that because of rewriting during read-while-write, the SDS rows may not be received in a fixed order, i.e., header interpolation may not be used during rewrite.

In operation 1212, it is determined whether the header can be obtained with interpolation. If so, the method continues to operation 1210; otherwise, the method 1200 continues to operation 1214.

In operation 1214, if a header with correct CRC was not obtained in a particular SDS row or header content is not permitted, C1' parity cannot be modified. In this case, the C1' parity is erased to indicate that C1 parity is unknown.

According to various embodiments, the method 1200 may be performed by a system via logic executing each operation, by a computer program product, or by some other device or system. The computer program product may include a computer readable storage medium having program code embodied therewith, and the program code may be readable/executable by a tape drive to cause the method 1200 to be performed.

Figure 13:
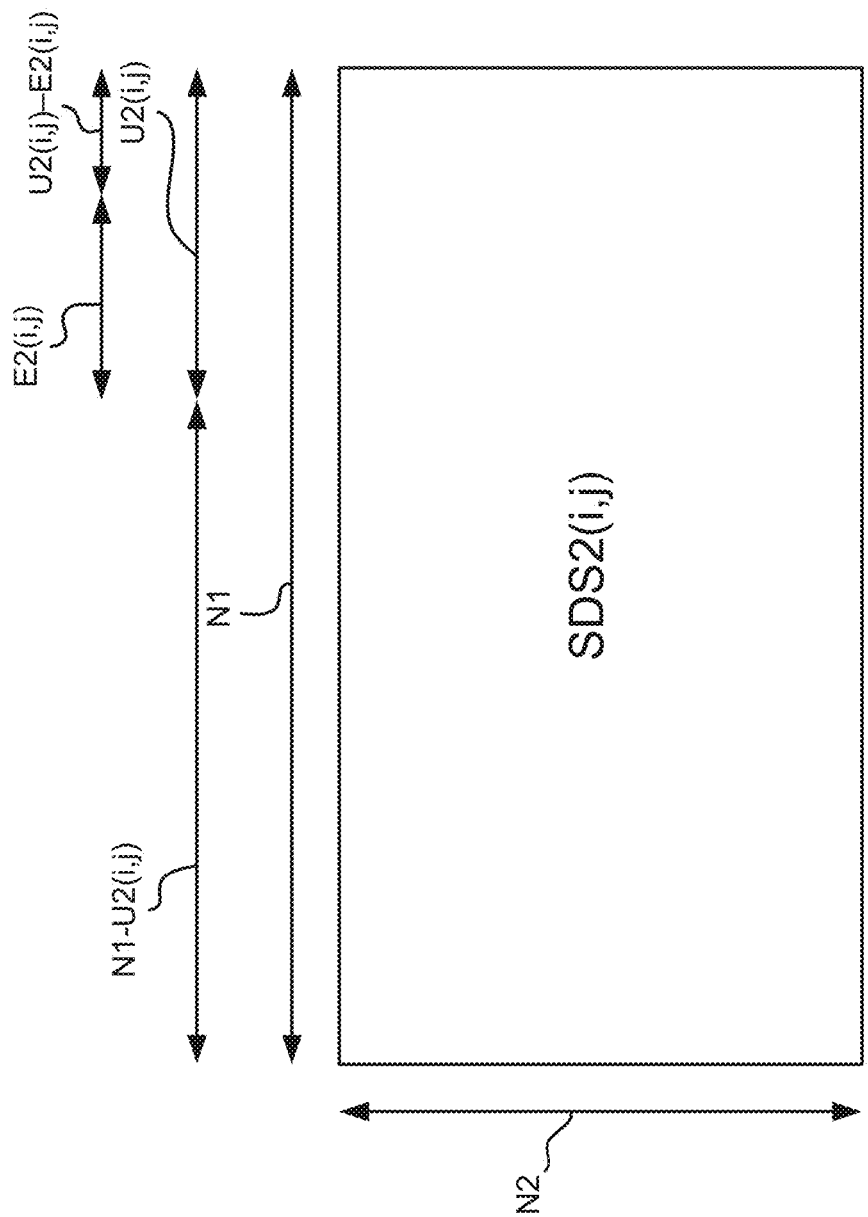
FIG. 13 is a representation of a sub data set—SDS2(i,j), according to one embodiment.

FIG. 13 shows a representation of SDS2(i,j) according to one embodiment. This representation shows the number of rows N2, the number of columns N1, an exemplary number of uncorrectable C2 codewords, U2(i,j), where i is an iteration counter and j is a current interleave in a row, an exemplary second parameter, E2(i,j), along with associated calculations. An SDS row contains j_max*N1 symbols. FIG. 13 depicts only an interleave j of the SDS2(i) where every row is a C1 codeword and every column is a C2 codeword, where SDS2(i) is obtained by interleaving j_max of the arrays in FIG. 13.

Figure 14:
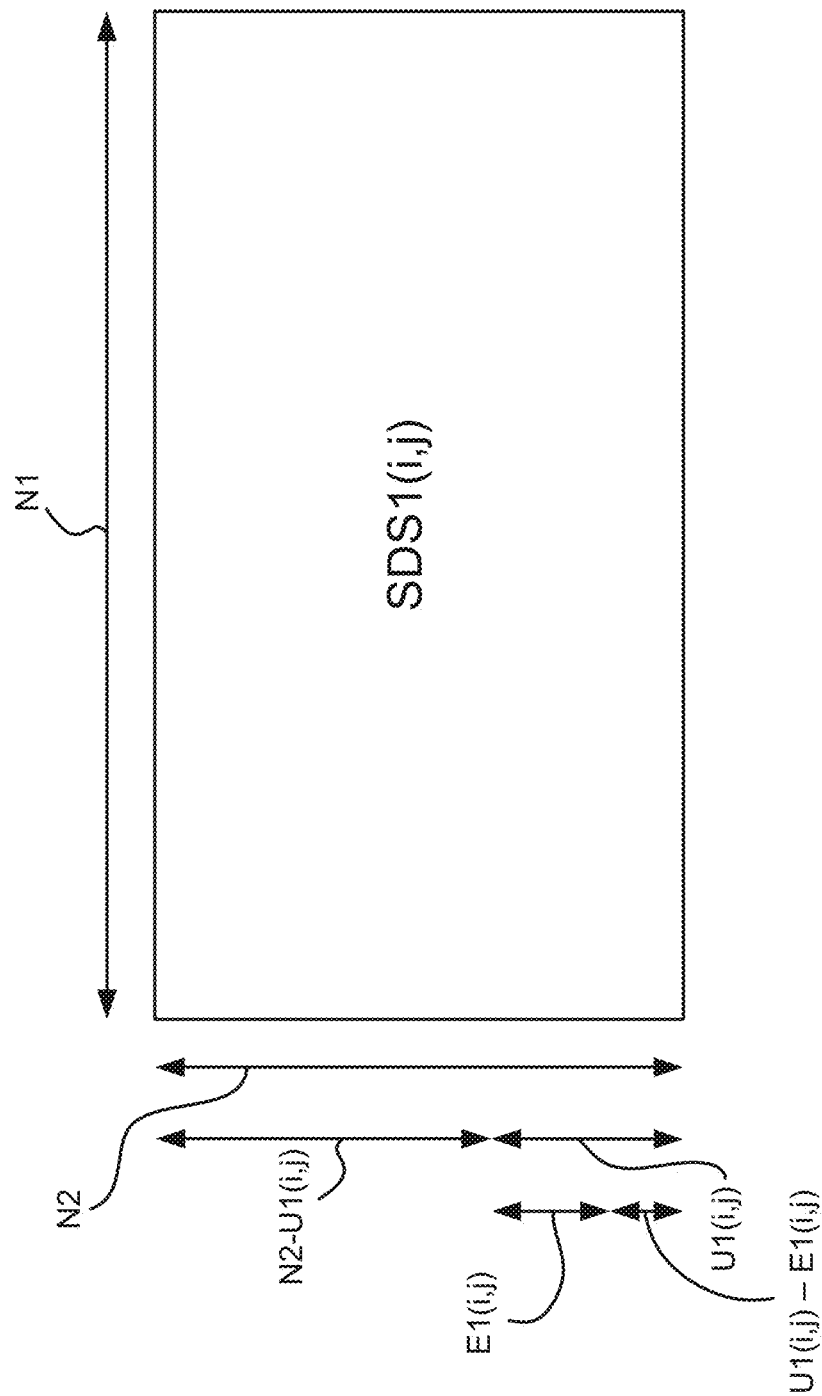
FIG. 14 is a representation of a sub data set—SDS1(i,j), according to one embodiment.

FIG. 14 shows a representation of SDS1(i,j) according to one embodiment. This representation shows the number of rows N2, the number of columns N1, an exemplary number of uncorrectable C1 codewords, U1(i,j), where i is an iteration counter and j is a current interleave in a row, an exemplary second parameter, E1(i,j), along with associated calculations. An SDS row contains j_max*N1 symbols. FIG. 14 depicts only an interleave j of the SDS1(i) where every row is a C1 codeword and every column is a C2 codeword, where SDS1(i) is obtained by interleaving j_max of the arrays in FIG. 14.

Figure 15:
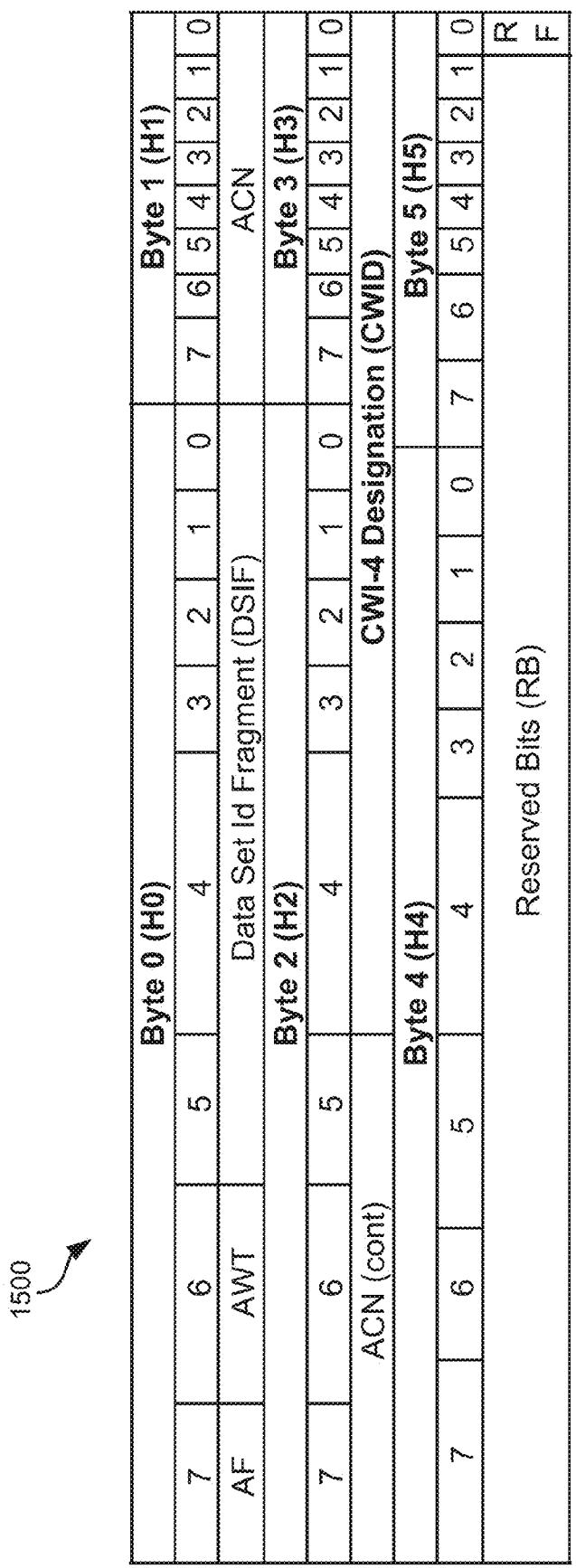
FIG. 15 shows a CWI-4 header layout according to one embodiment.

Now referring to FIG. 15, a CWI-4 header layout 1500 is shown according to one embodiment, assuming 32 channels (tracks). Other numbers of channels are also possible, such as 8 channels, 16 channels, 64 channels, etc. The CWI-4 header layout 1500 includes many different fields. Each field is described separately below, according to various embodiments. The CWI-4 header layout 1500 shown is not the only possible layout for a CWI-4 header, and the techniques, systems, and methods described herein may apply to other CWI-4 header layouts not specifically shown.

In the CWI-4 header 1500, the Amble Flag (AF) is used to indicate whether the CWI-4 is an Amble CWI-4 or a Data CWI-4, and is included in Byte 0 (H0). In one approach, the AF may be set to ONE if the CWI-4 is an Amble CWI-4, and ZERO if the CWI-4 is a Data CWI-4. When the last CWI-4 set of a data set is written to tape, there may not be any subsequent data sets ready to be written to tape. Due to the requirements of the read-while-write latency, the writing device cannot determine that the data set is complete until the last CWI-4 set has been verified. In the interval between writing the last CWI-4 set and it being verified on the tape, more CWI-4 sets must be written. In this case, the writing drive may perform either of the following: 1) repeat CWI-4 sets from the end of the last data set until it has verified that there is a good copy of every CWI-4 in the data set, or 2) write Amble CWI-4 sets until the verification is complete. All CWI-4s in an Amble CWI-4 set are Amble CWI-4s. Amble and Data CWI-4s are not mixed within a CWI-4 set typically.

The Adjacent Wrap Toggle (AWT) field is used to indicate which wrap the CWI-4 is used for, and is also included in Byte 0 (H0). The AWT may be set to the second least significant bit of the wrap number, e.g., ZERO for wraps 0, 1, 4, 5, etc., and ONE for wraps 2, 3, 6, 7, etc.

The Data Set ID Fragment (DSIF) field contains the six least significant bits of the data set number, and is also included in Byte 0 (H0).

The Absolute Codeword Object Set Sequence Number (ACN) of a Codeword Object Set is one greater than the ACN of the Codeword Object Set written immediately before it on tape, or is ZERO if the previously written 11-bit ACN is 2047. The ACN is included in Byte 1 (H1) and Byte 2 (H2). The ACN is the same in all CWI-4 headers in the Codeword Object Set. ACN is e.g., used for debugging, for failure analysis, etc.

The CWI-4 Designation (CWID) field indicates the location of a CWI-4 within a data set, and is included in Byte 2 (H2) and Byte 3 (H3). The order of first-written CWIDs within a CWI-4 set are known during reading. Therefore, header interpolation during reading may be used to recover erroneous CWI-4 Designations.

According to another CWI-4 rewrite scheme, the order of re-written CWIDs within a CWI-4 set are not known during reading. Therefore, header interpolation cannot be used to decode CWI-4 Designations of rewritten CWI-4s. Therefore, a header format with improved protection of CWID would be beneficial.

In various tape formats, the size of the CWID may vary. For example, in some tape formats, the CWID may be 12-bits in length, in other formats it may be 13-bits in length. Of course, other lengths are also possible, and may be accounted for in the other structures and schemes described herein. For example, the size of the CWID is likely to increase in future generations of tape drives, and the embodiments described herein may be altered to account for this increased CWID size.

The Reserved Bits (RB) field is reserved for future use and expansion, and may be set to ZEROs (to reserve it for future use). The RB is included in Byte 4 (H4) and Byte 5 (H5). The Rewritten Flag (RF) is included in Byte 5 (H5) and is used to indicate whether the CWI-4 is rewritten or not, and may be set to ZERO for the first written instance of the CWI-4 in the data set. If the CWI-4 is rewritten for any reason, for example if an error is detected during read-while-write, this flag is set to ONE in each rewritten instance of the CWI-4. This flag is ignored on interchange.

The Write Pass Identifier (WPI) field, which is not shown in FIG. 15 may be included in 4 bytes (Bytes 6-9: H6, H7, H8 and H9). The WPI corresponds to the write pass on which the data set was written. The content of this field is the same as the Tape Write Pass value in the Data Set Information Table (DSIT) for the data set to which the CWI-4s belong, except following an interrupted data set. DSIT is a particular CWI-4 in a data set. The payload of the DSIT describes the content of the data set.

The Header Parity field, also not shown in FIG. 15 is included in 2 bytes (Bytes 10-11: HA and HB). The Header Parity field is generated using a RS code. The 2-byte header parity is used to detect errors that have occurred when the 12-byte headers are read.

Figure 16:
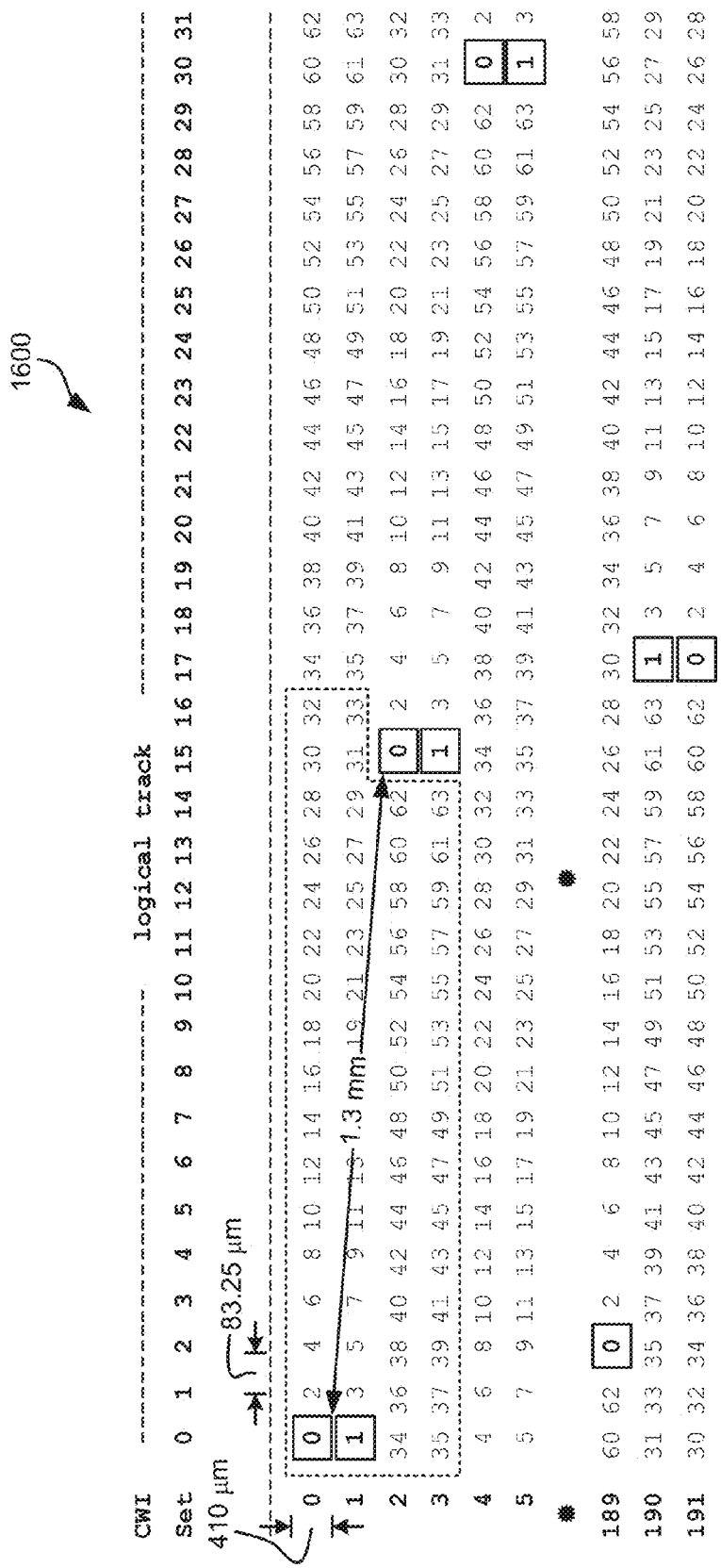
FIG. 16 shows an exemplary 32-track tape layout, according to one embodiment.

Now referring to FIG. 16, a 32-track tape layout 1600 is shown according to one embodiment. The entries in the tape layout 1600 are CWI-4 address modulo 64 indicating the sub data set (SDS) to which a particular CWI-4 belongs.

The tape layout 1600 interleaves C2 codewords and C1 codewords and thus de-correlates byte errors at the C2 decoder input. Also, each data set (6 MB) includes 64 SDS's, each SDS being a basic ECC data unit. In addition, headers are associated to an SDS row, with each SDS row being a CWI-4 which is itself a packet (having a size of about 1 kB). Then, each packet is assigned to one of the logical tracks, however many there may be (in this example, there are 32, but 8, 16, 64, 128, etc. are also possible).

An error rate of less than about $1 \times 10^{-3}$ at the C2 decoder input translates to an error rate of less than about $1 \times 10^{-17}$ at the C2 decoder output. The 32-track tape layout design has good de-correlation properties due to a 50% increase over other format's minimum packet spacing. As shown, the spacing between columns is 83.25 µm, while the spacing between rows is 410 p.m. This results in a packet spacing of 1.3 mm, as shown by the corner-to-corner distance of two packets from SDS 0, for illustrative purposes. In the tape layout example shown in FIG. 16, adjacent packets from SDS 0 and 1 make up a codeword object which are boxed for illustrative purposes.

Figure 17:
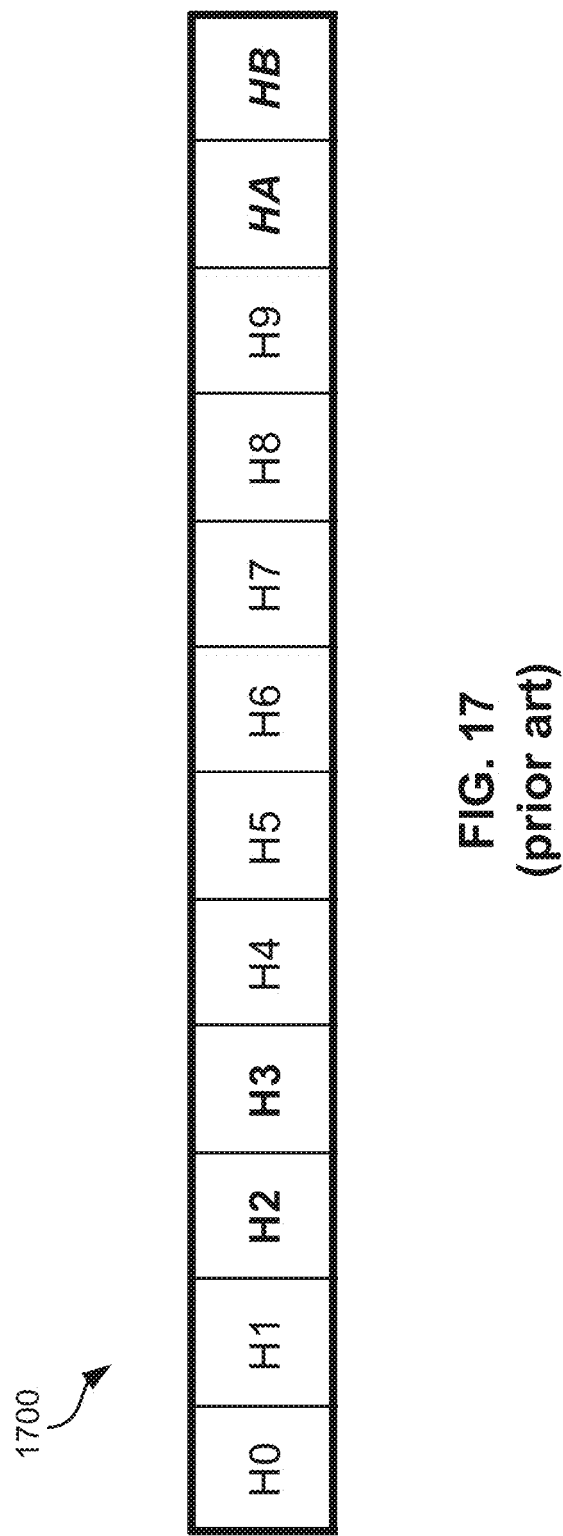
FIG. 17 shows a simplified layout of a portion of a header, according to the prior art.

Now referring to FIG. 17, a portion of a CWI-4 header 1700 is shown according to one embodiment. This portion of the CWI-4 header 1700 includes header bytes H0 to HB. Some parts or portion of the CWI-4 header 1700 may receive stronger protection to enable more reliable decoding of the CWI-4. The bytes which are most helpful in decoding a CWI-4 are header bytes H2 and H3 (designated in bold) which include the CWID, and bytes HA and HB (designated in bold italics) which include the header parity.

Figure 18:
FIG. 18 shows a CWI-4 layout according to the prior art.

FIG. 18 shows a CWI-4 layout 1800 on a tape according to the prior art. As shown, in the CWI-4, each row is a RS Codeword with bytes H0, H1, . . . , HB (in hexadecimal notation) being the twelve header bytes. The 234 data bytes, bytes 0-233 (each row is designated as A, B, C, or D), are protected by 12 parity bytes, bytes 234-245. Therefore, there are four codewords each having 246 bytes and a 12-byte header (unprotected). Of course, this is just an example and any number of bytes, header bytes, and parity bytes may be used.

The 12-byte header is not protected by the four C1 codewords in the CWI-4. Each CWI-4 with a 12-byte header is written on one track of tape by reading out the array column by column as follows: H0 H1 H2 H3 H4 H5 H6 H7 H8 H9 HA HB A0 B0 C0 D0 A1 B1 C1 D1 . . . A245 B245 C245 D245.

The first C1 RS codeword contains: A0 A1 A2 . . . A233 A234 . . . A244 A245 (e.g., it is a 246-byte codeword). Likewise, the second C1 RS codeword contains: B0 B1 B2 . . . B233 B234 . . . B244 B245 (246-byte codeword), the third C1 RS codeword contains: C0 C1 C2 . . . C233 C234 . . . C244 C245 (246-byte codeword), and the fourth C1 RS codeword contains: D0 D1 D2 . . . D233 D234 . . . D244 D245 (246-byte codeword). Each codeword is the same length (246 bytes) and none of the header fields or bytes are repeated.

That is to say that each C1 codeword has 12 bytes of parity (e.g., A234 to A245 in the first C1 codeword) marked in the table by the shaded bytes. Of course, each codeword may contain more or less bytes than those shown in layout 1800 (246 bytes), such as 240 bytes, 242 bytes, 250 bytes, 255 bytes, 256 bytes, 257 bytes, etc.

When a CWI-4 Set is written on a tape, either 16 CWI-4's are written to the tape (currently in LTO drives) or 32 CWI-4's are written to the tape (currently in enterprise drives) all at once, in various approaches. Each CWI-4 is associated with a 12-byte header. Therefore, 16 or 32 headers are written all at once on tape. Accordingly, H2 and H3 may be better protected in order to improve the error rate after decoding when H2 and H3 (which contain the CWID) are better protected. The header parity may also be better protected in HA and HB so that the CWID may be more reliably decoded from H2 and H3. Remaining parts or portions of the header do not change within a CWI-4 set and therefore better protection of these bytes does not provide noticeably more reliable operation, i.e., unequal protection of header bytes of 12-byte headers is possible, according to one embodiment.

Figure 19:
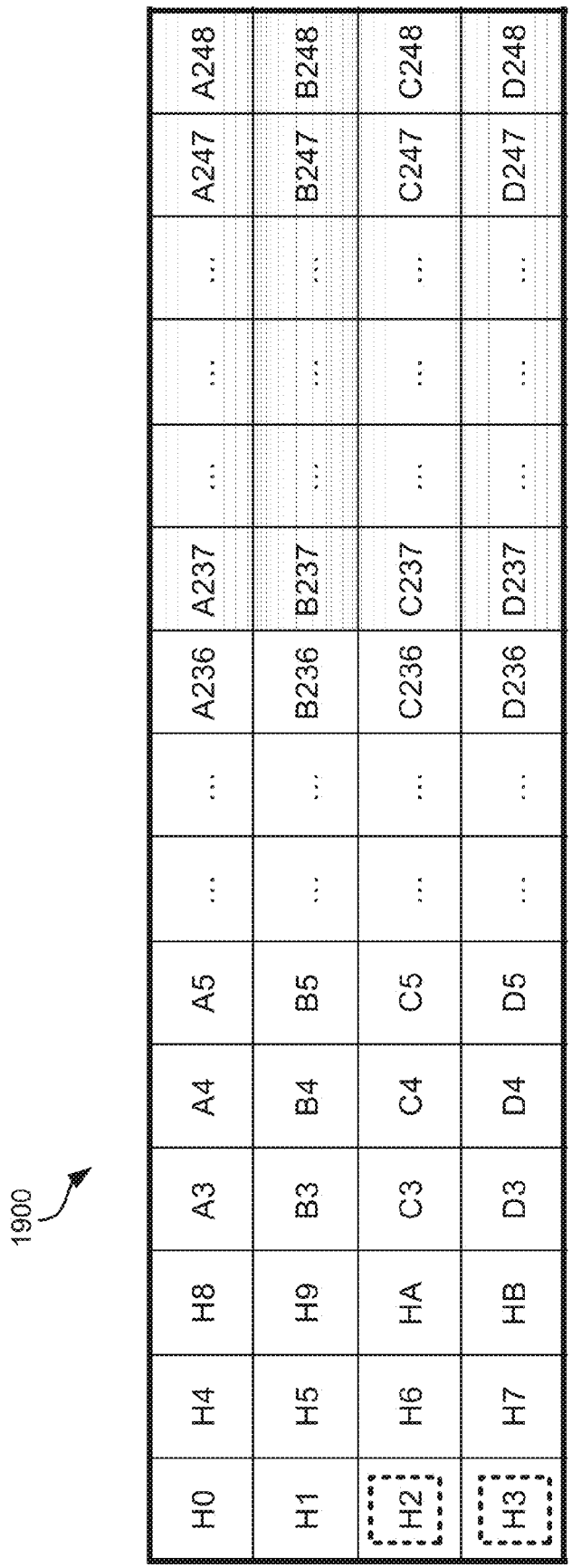
FIG. 19 shows another CWI-4 layout according to the prior art.

Now referring to FIG. 19, a prior art example of a CWI-4 layout 1900 is shown. The CWI-4 1900 contains 996 bytes including the 12-byte header, which is protected by the four C1' codewords (denoted as such because it protects the header), unlike in the prior example. However, each byte of the header has the same protection, e.g., an equal protection scheme. Each row is a 249-byte RS Codeword. The first three CWI-4 bytes in each C1' codeword are header bytes. Bytes H0 through HB are the 12 header bytes. Each C1' codeword has 12 bytes of parity marked by the shaded bytes (237-248 for each row).

The bytes are designated as such: A0=H0, A1=H4, A2=H8 (249-byte codeword A0 A1 A2 A3 A4 . . . A248), B0=H1, B1=H5, B2=H9 (249-byte codeword B0 B1 B2 B3 B4 . . . B248), C0=H2, C1=H6, C2=HA (249-byte codeword C0 C1 C2 C3 C4 . . . C248), and D0=H3, D1=H7, D2=HB (249-byte codeword D0 D1 D2 D3 D4 . . . D248).

Header bytes H0, H4, and H8 are in the first codeword (row 1). Header bytes H1, H5, and H9 are in the second codeword (row 2). Header bytes H2, H6, and HA are in the third codeword (row 3). Also, header bytes H3, H7, and HB are in the fourth codeword (row 4). This means that H2 and H3 are split between the third and fourth codewords, which is undesirable because both rows must be decoded properly in order to obtain the correct CWID which provides for placement information for the codewords. Because of the distribution of header bytes across the codewords, correct decoding of two C1' codewords is required to obtain CWID. As previously described, CWID is split across header bytes H2 and H3.

In CWI-4 layout 1900. H2 and H3 are not in one RS codeword, one is in the third codeword and one is in the fourth codeword, as indicated by the dashed boxes. The probability of unsuccessful CWID decoding, therefore, is equal to $1-(1-1\times10^{-3})^2=2\times10^{-3}$, where it is assumed that the probability of correctly decoding an RS codeword is $1-1\times10^{-3}=0.999$, and the byte errors at the output of the modulation decoder in each channel (track) are uncorrelated.

If C2 decoding is based on "erasure decoding" as described above, improvements in CWID decoding (e.g., a lower probability of failing to decode CWIDs) does not necessarily lead to an improvement in error rate performance. One-pass C1/C2 decoding and iterative C1/C2 decoding using "error decoding" significantly improves error rate performance if an abundance of errors in the C1 codewords does not exist, i.e., cycle slips or very large bursts of errors do not occur because of media defects, instantaneous speed variations, or other reasons.

As described before, CWIDs are the addresses of CWI-4s within the data set. Successful decoding of CWIDs is required for correct placement of C1 (or C1') uncorrectable errors ("uncorrectables") within the SDS's because, otherwise, the SDS row corresponding to a particular CWID that was not able to be decoded has to be erased.

Improved protection of CWIDs is extremely useful to successfully decode CWIDs and improve error rate performance while performing one-pass C1 decoding followed by C2 error decoding or iterative C1/C2 decoding. Improved protection of CWIDs while rewriting CWI-4s is useful to improve error rate performance. Also, header interpolation cannot be used during efficient rewrite. Therefore, another mechanism that may be used to protect CWIDs would help to improve the performance and protection of CWIDs.

In contrast to the CWI-4 layouts shown in FIGS. 18-19, a CWI-4 layout 2000 shown in FIG. 20 includes a better codeword interleave according to a first embodiment. In this CWI-4 layout 2000, each CWI-4 includes 996 bytes including the 12-byte header. Each row is a 249-byte RS Codeword. The first three bytes in each C1' codeword are header bytes. Bytes H0 through HB are the 12 header bytes. These twelve bytes are protected by the parity bytes 237-248 in each row. Header bytes H0, H6, and H7 are in the first codeword, header bytes H1, H2, and H3 are in the second codeword, header bytes H4, H8, and H9 are in the third codeword, and header bytes H5, HA, and HB are in the fourth codeword. Therefore, H1, H2, and H3 are in one C1' codeword, H6 and H7 are in another C1' codeword, H8 and H9 are in yet another C1' codeword, and HA and HB are in the last C1' codeword.

In a further embodiment, HA and HB may also not be split between different C1' codewords. In other embodiments, any set of header bytes (which contain a header field, such as parity, CWID, etc.) may be stored such that the header field is not split across different C1' codewords, such as by not splitting header bytes H4 and H5 between different C1' codewords, H and H2, H8 and H9, etc.

That is to say, important header bytes may be kept from splitting across codewords (rows). In one such approach, header bytes H2 and H3 may be kept from splitting across codewords in such a way that decoding reliability is improved. In a further approach, header bytes HA and HB may be kept from being stored in different codewords, or any other important header bytes as desired. Furthermore, if the CWID is stored in header bytes other than H2 and H3, then those header bytes where the CWID is stored may be kept from being split across different codewords.

In the first embodiment, A0=H0, A1=H6, A2=H7 (249-byte codeword A0 A1 A2 A3 A4 . . . A248), B0=H1, B=H2, B2=H3 (249-byte codeword B0 B B2 B3 B4 . . . B248), C0=H4, C1=H8, C2=H9 (249-byte codeword C0 C1 C2 C3 C4 . . . C248), and D0=H5, D=HA, D2=HB (249-byte codeword D0 D1 D2 D3 D4 . . . D248).

Of course, any important header bytes may be kept from being split across different C1' codewords when the codewords have any length of bytes, such as 240 bytes, 243 bytes, 246 bytes, 249 bytes (as shown), 255 bytes, etc.

In this layout 2000, correct decoding of only one C1' codeword is required to obtain the CWID, which is included in H2 and H3 in the second codeword (row 2). The probability of unsuccessful CWID decoding=$1-(1-1\times10^{-3})=1\times10^{-3}$ where it is assumed that the probability of correctly decoding C1' codeword is $1-1\times10^{-3}=0.999$ and the byte errors at the output of the modulation decoder in each channel (track) are uncorrelated. This provides a better probability of correct decoding than any of the previously described CWI-4 header layouts.

Now referring to FIG. 21, a CWI-4 layout 2100 on tape is shown according to a second embodiment. Each byte of the header does not have the same protection (unequal protection). Bytes H2 and H3 (along with H0) are part of the first codeword and HA and HB (along with H5) are part of the fourth codeword. The remaining header bytes are not protected by parity or the C1' codeword. Therefore, this layout 2100 provides unequal protection to the header bytes, as parts or a portion of the header receives protection, while other parts do not.

In other embodiments, each codeword may have the same length, while still providing unequal protection to important parts of the header, such as H2 and H3 (which contain the CWID).

Furthermore, H2 and H3 are not split between C1' codewords, as in the previous embodiment. Of course, any row may be used to store any important header bytes which will receive greater protection, and not be split across different C1' codewords. For example, header bytes H2 and H3 (containing the CWID) may be stored in any of the first, second, third, or fourth codeword, as long as the bytes are not split across any of the rows.

In layout 2100, A0=H2, A1=H3 in a 248-byte codeword (A0 A1 A2 A3 A4 . . . A247), then a 246-byte codeword (B0 B1 B2 B3 B4 . . . B245), then a 246-byte codeword (C0 C1 C2 C3 C4 . . . C245), and D0=HA, D1=HB in a 248-byte codeword (D0 D1 D2 D3 D4 . . . D247).

One or more of the codewords may have a length that is different from the other codewords. For example, just the first codeword (protecting H2 and H3) may have 248 bytes, while the other three codewords have just 246 bytes. Therefore, variable-length C1 codewords within a CWI-4 are possible and may be used to provide protection for important header bytes. Also, each C1 or C1' codeword has 12 bytes of parity marked by the shaded bytes 236-247 (C1' codewords in rows 1 and 4) and 234-245 (C1 codewords in rows 2 and 3).

Since the CWID in bytes H2 and H3 of the headerized codeword interleave are embedded into one C1' codeword, if this codeword is correctly decoded, then a decoded CWI-4 may correctly be placed within the SDS. Other fields within the header may be determined by cross-track interpolation or voting, as known in the art. Two C1 codewords include (234+12 parity bytes)=246 bytes, whereas the other two C1' codewords include (234+2 coded header bytes+12 parity bytes)=248 bytes. Accordingly, the codewords are uneven in length, with two codewords being 248 bytes in length, and two codewords being 246 bytes in length.

Therefore, the headerized CWI-4 includes 8 bytes (remaining uncoded header bytes)+2×246 bytes+2×248 bytes=996 bytes in total. However, correct decoding of only one C1' codeword is sufficient to obtain the CWID. This results in the probability of unsuccessful CWID decoding=$1-(1-1\times10^{-3})=1\times10^{-3}$ where it is assumed that the probability of correctly decoding C1' codeword is $1-1\times10^{-3}=0.999$ and the byte errors at the output of the modulation decoder in each channel (track) are uncorrelated.

In this embodiment, only important parts of the CWI-4 header (H2 and H3, and HA and HB) are embedded in C1' codewords which results in improved C1 error rate performance because of shorter C1' codewords (as all 4 C1/C1' codewords do not have the same length, uncoded header bytes (H0, H1, H6, H7, H4, H5, H8, and H9) may be inserted to ensure that each C1/C1' codeword is in one of the 4 interleaves). Of course, other parts of the header may be embedded in C1' codewords, such as H6 and H7 instead of HA and HB, H8 and H9 instead of HA and HB, etc. In each of these alternate embodiments, it is preferred to maintain H2 and H3 in a C1' codeword, as this allows improved probability of proper placement of the CWI-4 in the SDS.

In a third embodiment, certain header fields, such as the CWID, the header parity, etc., may be duplicated (i.e., the header bytes where the desired information is stored may be duplicated and protected, or just duplicated). In this way, the proper decoding of either of the duplicated important header fields may result in a decoded codeword which may be properly placed.

Now referring to FIG. 22, CWI-4 layout 2200 shows unequal protection according to one embodiment with certain header bytes duplicated. In this layout 2200, each byte of the header does not have the same protection. Header bytes H2 and H3 are part of the first codeword, while fifteen reserved bits in header bytes H4 and H5 are used to store another copy of the 13-bit CWID. These two bytes H4 and H5 are therefore referred to as H2' and H3'. All the other header bytes are not protected (H0, H1, H6, H7, H8, H9, HA, and HB). Therefore, unequal protection is provided. Furthermore, H2 and H3, and H2' and H3' are not split between C1' codewords.

In this embodiment, the layout 2200 comprises: A0=H2, A1=H3 in a 248-byte codeword (A0 A1 A2 A3 A4 . . . A247), then a 246-byte codeword (B0 B1 B2 B3 B4 . . . B245), then C0=H2', C1=H3' in a 248-byte codeword (C0 C1 C2 C3 C4 . . . C247), followed by a 246-byte codeword (D0 D1 D2 D3 D4 . . . D245). This layout 2200 has variable-length C1 and C1' codewords within the CWI-4. Each C1 and C1' codeword has 12 bytes of parity marked by the shaded bytes 236-247 (C1' codewords in rows 1 and 3) and 234-245 (C1 codewords in rows 2 and 4).

Since the unequal protection may be applied to any row in the CWI-4, it does not matter which row has the unequal protection applied thereto, as long as the bytes which are to be protected are in that row (e.g., header bytes containing the CWID).

In layout 2200, the CWI Designation bytes in H2 and H3 are embedded into two C1' codewords, the first and third codeword as shown (of course, any of the four codewords may be used, as the row placement is for explanatory purposes only). If any of the two C1' codewords are correctly decoded, then the CWI-4 may correctly be placed within the SDS. Other fields within the header may be determined by cross-track interpolation or voting as known in the art.

Two C1 codewords include (234+12 parity bytes)=246 bytes, whereas the other two C1' codewords include (234+2 coded header bytes+12 parity bytes)=248 bytes. Also, eight uncoded header bytes (H0, H1, H6, H7, H8, H9, HA, and HB) are also included. The headerized CWI-4 includes these 8 bytes (remaining uncoded header bytes)+2×246 bytes+2× 248 bytes=996 bytes in total.

In order to provide the additional copy of CWID, fifteen reserved bits in the header (in H4 and H5) are used to store another copy of CWID. Therefore, H4 and H5 (H2' and H3' in the table because they now include CWID and RF) are embedded into one C1' codeword, which allows for the possibility of either of the codewords having the CWID embedded therein to be correctly decoded for placement within the SDS.

Therefore, correct decoding of any one of the two C1' codewords is sufficient to obtain CWID, and thus provide proper placement within the SDS. The probability of unsuccessful CWID decoding=$(1\times10^{-3})^2=1\times10^6$ where it is assumed that the probability of correctly decoding C1' codeword is $1-1\times10^{-3}=0.999$ and the byte errors at the output of the modulation decoder in each channel (track) are uncorrelated.

Now referring to FIG. 23, a CWI-4 layout 2300 on tape is shown according to one embodiment. In this layout 2300, the CWID bytes (H2 and H3) are repeated four times and encoded by the parity in each RS codeword. Each codeword is a stand-alone unit and if it is decoded correctly, then it may be correctly placed within the SDS. Other fields within the header may be determined by cross track interpolation or voting, as has been done in other tape drives. However, the codeword will be placed properly. This layout generally shows how the CWID bytes may be better protected so that the CWI-4 may be placed properly in the SDS after decoding thereof by duplicating the CWID, in this embodiment four times, as opposed to just once or twice.

Each byte of the header does not have the same protection, so unequal protection is being used. Bytes H2 and H3 are part of the first, second, and third codeword, as well as 15 reserved bits in header bytes H4 and H5 being used to store another copy of the 13-bit CWID. These two bytes H4 and H5 are therefore referred to as H2' and H3'. All the other header bytes are not protected. Furthermore, H2 and H3, and H2' and H3' are not split between C1' codewords.

The four bytes added (beyond what is needed to simply store each byte once) to the CWI-4 results in an increase in overhead (x %), where the increase is x=1/249*100, resulting in decreased format efficiency.

In this layout 2300, A0=H2, A1=H3 in a 248-byte codeword (A0 A1 A2 A3 A4 . . . A247), B0=H2, B1=H3 in a 248-byte codeword (B0 B B2 B3 B4 . . . B247), C0=H2, C1=H3 in a 248-byte codeword (C0 C1 C2 C3 C4 . . . C247), and D0=H2', D1=H3' in a 248-byte codeword (D0 D1 D2 D3 D4 . . . D247). Each C1' codeword has 12 bytes of parity marked by the shaded bytes 236-247. Of course, other lengths of C1' or C1 codewords are possible and may be used in this embodiment.

Each C1' codeword is a stand-alone unit and if it is correctly decoded, then it may be correctly placed within the SDS. Other fields within the header may be determined by cross-track interpolation or voting as known in the art.

The CWI-4 2300 includes 4×248 bytes=992 bytes, with each headerized CWI-4 having 4×2 bytes (the remaining 8 uncoded header bytes)+992 bytes=1000 bytes (instead of 996 bytes as in CWI-4 layout 2200 in FIG. 22). Additionally, in the CWI-4 layout 2300 in FIG. 23, format efficiency decreases because of the 4 bytes of H2/H3 that are added (repeated). This corresponds to increasing CWI-4 overhead by about 0.4% as CWI-4 size is currently about 1 kB.

However, correct decoding of any of the four C1' codewords is sufficient to obtain CWID, instead of any one of two C1' codewords. Therefore, the probability of unsuccessful CWID decoding=$(1-0.999)^4=(1\times10^{-3})^4=1\times10^{-12}$, where it is assumed that the probability of correctly decoding C1' codeword is $1-1\times10^{-3}=0.999$ and the byte errors at the output of the modulation decoder in each channel (track) are uncorrelated.

As shown in FIG. 24, another CWI-4 layout 2400 may have a similar arrangement to CWI-4 layout 2300 in FIG. 23; however, in FIG. 24, the CWI-4 layout 2400 repeats H2 and H3 in each C1' codeword along with HA and HB (or some other important header bytes) also being repeated in two C1' codewords.

In the CWI-4 layout 2400, the CWID bytes H2 and H3 are repeated four times and embedded into each C1' codeword. Also, ten uncoded header bytes (H0, H1, H4, H5, H6, H7, H8, H9, HA, and HB) are included in the CWI-4 where the uncoded header parity bytes HA and HB are duplicated.

Each byte of the header does not have the same protection (unequal protection). Bytes H2 and H3 are part of all codewords (repeated four times). HA and HB are repeated twice in the second and fourth interleave. All the other header bytes are not protected. Furthermore, H2 and H3 (which contain the CWID) are not split between C1' codewords.

In CWI-4 layout 2400, A0=H2, A1=H3 in a 248-byte codeword (A0 A1 A2 A3 A4 . . . A247), B0=H2, B1=H3 in a 248-byte codeword (B0 B1 B2 B3 B4 . . . B247), C0=H2, C1=H3 in a 248-byte codeword (C0 C1 C2 C3 C4 . . . C247), and D0=H2, D1=H3 in a 248-byte codeword (D0 D1 D2 D3 D4 . . . D247). Each C1' codeword has 12 bytes of parity marked by the shaded bytes.

In this layout 2400, eight bytes are added (beyond what is needed to simply store each byte once) to the CWI-4 resulting in an x % increase in overhead, x=(2/249)*100, which in turn results in a decreased format efficiency.

In one embodiment, all of header bytes H2 and H3 (or whichever header bytes contain the CWID) are duplicated. In an alternate embodiment, only the CWID bits in the header bytes are duplicated, thereby duplicating less information and increasing efficiency.

According to the CWI-4 layouts described in FIGS. 20-24, the CWID field in the CWI-4 header (in H2 and H3) may be kept from splitting among two or more C1' codewords, i.e., either the C1 codeword does not contain (e.g., protect or embed) any part of the CWID field (i.e., one or more bits of CWID) or C1' includes (protects, embeds) all of the CWID field. Furthermore, it is desirable not to split other header fields among different C1' codewords, and the CWI-4 layout is capable of accomplishing that, depending on which header fields are desired to be kept together (such as H1 and H2; H4 and H5 such as when the CWID is stored in the reserved bits; H6, H7, H8 and H9; HA and HB; etc.).

The WPI is the same in all M headers in a CWI-4 set. There is no requirement to embed WPI into one or multiple C1' codewords, according to the previous embodiments described herein. In one of the CWI-4 layouts, WPI is split into two parts and embedded into two C1' codewords.

In the CWI-4 layouts shown in FIGS. 21-24, only part of the header is embedded into CWI-4, i.e., only part of the header is protected by C1' codewords, thereby providing unequal protection. Additionally, C1/C1' codewords in the CWI-4 may have different lengths or the same lengths, depending on how many extra bits are acceptable to be added beyond what is needed to store each header byte exactly once.

In the CWI-4 layouts shown in FIGS. 22 and 23, the fifteen reserved bits in the CWI-4 header (H4 and H5) are used to store information, e.g., another copy of the CWID (header bytes H2 and H3).

In the CWI-4 layouts shown in FIGS. 23 and 24, the CWID (header bytes H2 and H3) is repeated in several C1' codewords at the expense of increasing header overhead, i.e., reducing format efficiency. However, the probability of decoding the CWID is drastically increased.

Figure 25:
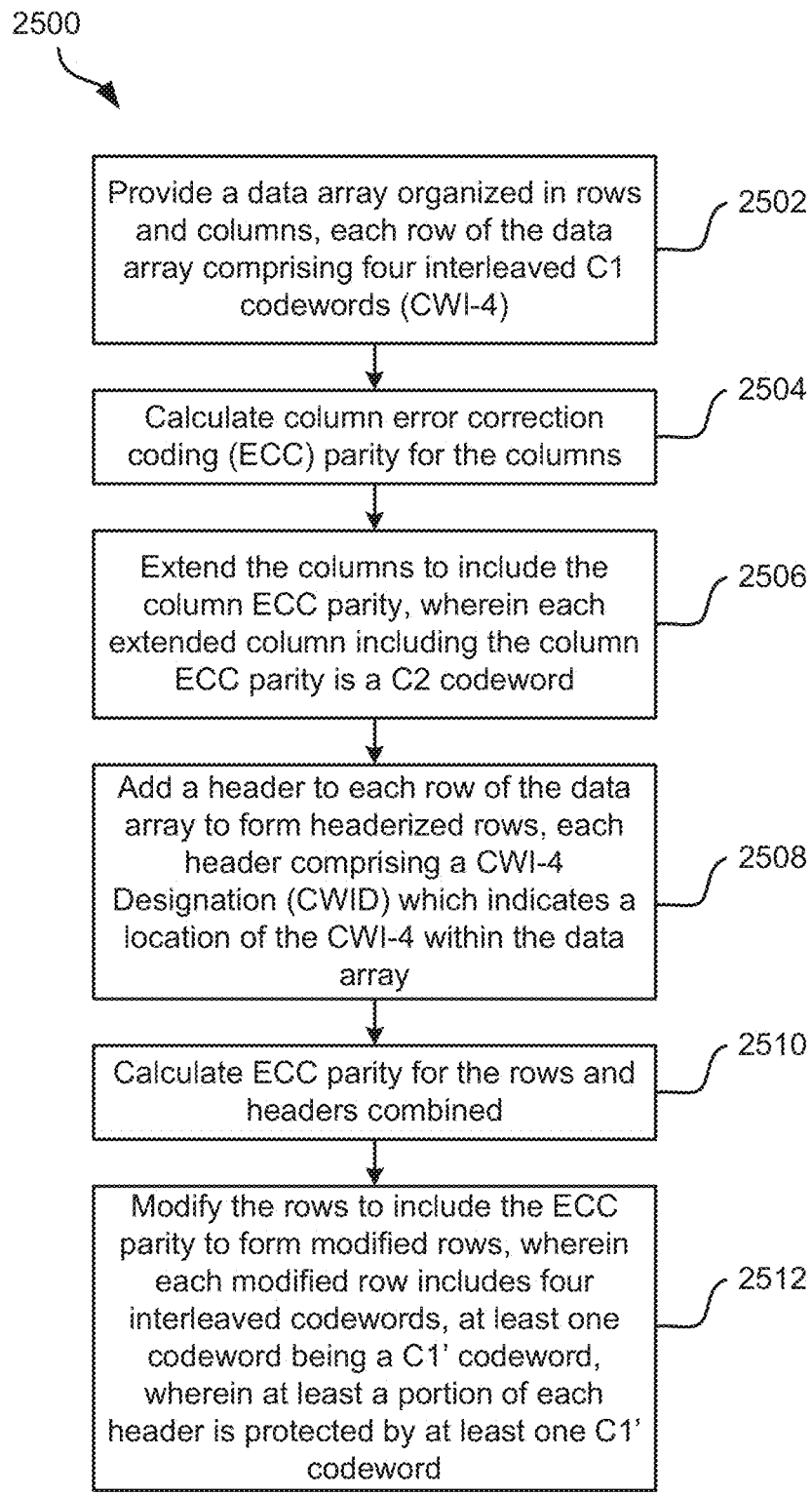
FIG. 25 is a flowchart of a method according to one embodiment.

Now referring to FIG. 25, a flowchart of a method 2500 for integrating data and header protection is shown according to one embodiment. The method 2500 may be executed in and/or with the use of any of the environments, systems, apparatuses, and/or schemes described in FIGS. 1-24, in various approaches. Furthermore, the method 2500 may include more or less operations than those specifically described with reference to FIG. 25.

In operation 2502, a data array organized in rows and columns is provided. Each row of the data array comprises four interleaved C1 codewords (e.g., each row is a CWI-4). Furthermore, the data array may be a SDS, and may be read from a magnetic tape through one or more read channels, as would be understood by one of skill in the art.

In optional operation 2504, if it has not already been done when the data array is provided, column ECC parity is calculated for the columns. This may be referred to as C2 parity, and may be used to determine reliability of the decoded bits of each column.

In optional operation 2506, if it has not already been done when the data array is provided, the columns are extended to include the column ECC parity. Each extended column which includes the column ECC parity is a C2 codeword, as described in more detail herein.

In operation 2508, a header is added to each row of the data array to form headerized rows, each header comprising a CWID which indicates a location of the CWI-4 within the data array. Also, at least a portion of each header is protected by C1' codewords, and in some embodiments, only a portion and not all of the header is protected by C1' codewords (unequal protection).

In operation 2510, ECC parity is calculated for at least one C1 codeword in each of the headerized rows, as described previously. Of course, some or all of the rows may have parity calculated without headers being added prior to the parity calculation which includes at least a portion of the header (such as 1 byte, 2 bytes, 3 bytes, 4 bytes, 6 bytes, all 12 bytes, etc.).

In operation 2512, the headerized rows are modified to include the ECC parity to form modified rows. Each modified row includes four interleaved codewords, at least one codeword being a C1' codeword, and at least a portion of each header is protected by at least one C1' codeword. That is to say that all of the CWID is recoverable by correctly decoding only one C1' codeword. Modifying the rows does not actually add any bytes to the rows (make the rows larger), instead the length of the codewords is extended because header bytes which were just appended before the C1 codeword are now within the C1' codeword. Therefore, this operation may be defined as extending the CWI-4 instead of modifying the headerized rows because at least one codeword has bytes added thereto (e.g., gets longer).

In operation 2512, according to one embodiment, the ECC parity is recomputed to now also protect header bytes. The old C1 row parity is overwritten with newly computed C1' row parity.

According to one approach, multiple copies of the CWID for each header are stored in a corresponding number of C1' codewords such that two or more C1' codewords comprise the CWID in a single modified row.

In another approach, none of the CWIDs are split across multiple C1' codewords in a single modified row.

In one embodiment, each header is 12 bytes in length (byte 0 to byte 11), and each header comprises: an amble flag, an AWT field, and a DSIF stored in byte 0 (H0); an ACN stored in bytes 1 and 2 (H1 and H2); the CWID stored in bytes 2 and 3 (H2 and H3); reserved bits in bytes 4 and 5 (H4 and H5); a WPI stored in bytes 6, 7, 8, and 9 (H6, H7, H8, and H9); and header parity stored in bytes 10 and 11 (HA and HB).

According to a further embodiment, H2 and H3 of each header may be stored in a first C1' codeword such that the first C1' codeword comprises the CWID. Furthermore, in some embodiments, H4 and H5 may be stored in a second C1' codeword such that the second codeword comprises the reserved bits. In one approach, H2 and H3 of each header may be copied, reproduced, or otherwise duplicated and stored in the reserved bits in H4 and H5. In this way, there are two independent copies of the CWID, and the correct decoding of either results in the ability to properly place the CWI-4 in the data set.

In another further embodiment, HA and HB may be stored in a second C1' codeword such that the second C1' codeword comprises the header parity.

According to another embodiment, H6 and H7 may be stored in a second C1' codeword and H8 and H9 may be stored in a third C1' codeword such that the second and third C1' codewords comprise the WPI. Of course, any of these specific header bit storage schemes may be combined in any way to more powerfully protect the individual parts of the header.

According to one embodiment, each header may be at least 12 bytes in length, and the CWID may be stored in byte 2 (H2) and byte 3 (H3) of each header, or in any other two bytes of the header, adjacent or not adjacent. Furthermore, H2 and H3 of each header (or whatever two bytes that comprise the entirety of the CWID) may be stored in a single C1' codeword such that the C1' codeword comprises all of the CWID.

In another approach, at least two copies (e.g., two, four, etc.) of H2 and H3 (or whatever two bytes that comprise the entirety of the CWID) of each header may be stored in a corresponding number (e.g., two, four, etc.) C1' codewords such that each of the two C1' codewords comprise the CWID, and the proper decoding of either results in the CWID.

In one such embodiment, four copies of the CWID may be stored, one CWID instance in each row, such that each copy of the CWID is not split across more than one C1' codeword. In one approach, the reserved bytes (H4 and H5) may be used to store the additional CWIDs, or additional bytes may be added to the CWI-4.

In yet another approach, only a portion of each header may be protected by C1' codewords. The portion that is protected includes the CWID which is stored in a single C1' codeword.

According to another approach, each of the row ECC parity and the column ECC parity comprise RS parity.

The method 2500 may be executed in a system, apparatus, computer program product, or in any other way known in the art. In one such embodiment, a system (such as a tape drive subsystem) may include a processor (such as a CPU, ASIC, FPGA, etc.) and modules (such as an ECC encoder, a multiplexer, etc.), code, and/or logic (soft or hard) integrated with and/or executable by the processor to execute the steps of the method 2500 or portions thereof. In another embodiment, a computer program product may include a computer readable storage medium having program code embodied therewith, the program code readable/executable by a tape drive to execute the method 2500 or portions thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system for integrating data and header protection, the system comprising a processor and logic integrated with and/or executable by the processor, the logic being configured to:
   receive a data array organized in rows and columns, each row of the data array comprising two or more interleaved C1 codewords (CWI); and
   modify one or more rows of the data array to include a header and error correction code (ECC) parity to form one or more modified rows,
   wherein each modified row includes two or more interleaved codewords, at least one codeword being a C1' codeword which includes ECC parity, wherein each header comprises a CWI Designation (CWID) which indicates a location of the CWI within the data array, and
   wherein none of the CWIDs are split across multiple C1' codewords in a single modified row.

2. The system as recited in claim 1, wherein each header is 12 bytes in length (byte 0 to byte 11), and wherein each header comprises:
   an amble flag, an adjacent wrap toggle (AWT) field, and a data set identifier fragment (DSIF) stored in byte 0 (H0);
   an absolute codeword object set sequence number (ACN) stored in bytes 1 and 2 (H1 and H2);
   the CWID stored in bytes 2 and 3 (H2 and H3);
   reserved bits in bytes 4 and 5 (H4 and H5);
   a write pass identifier (WPI) stored in bytes 6, 7, 8, and 9 (H6, H7, H8, and H9); and
   header parity stored in bytes 10 and 11 (HA and HB).

3. The system as recited in claim 2, wherein H2 and H3 of each header are stored in a first C1' codeword such that the first C1' codeword comprises the CWID.

4. The system as recited in claim 3, wherein H4 and H5 are stored in a second C1' codeword such that the second C1' codeword comprises the reserved bits.

5. The system as recited in claim 4, wherein H2 and H3 of each header are copied and stored in the reserved bits in H4 and H5.

6. The system as recited in claim 3, wherein HA and HB are stored in a second C1' codeword such that the second C1' codeword comprises the header parity.

7. The system as recited in claim 3, wherein H6 and H7 are stored in a second C1' codeword and H8 and H9 are stored in a third C1' codeword such that the second and third C1' codewords comprise the WPI.

8. The system as recited in claim 1, wherein each header is 12 bytes in length, and wherein the CWID is stored in byte 2 (H2) and byte 3 (H3) of each header.

9. The system as recited in claim 8, wherein H2 and H3 of each header are stored in a single C1' codeword such that the C1' codeword comprises the CWID.

10. The system as recited in claim 8, wherein two copies of H2 and H3 of each header are stored in two C1' codewords such that each of the two C1' codewords comprise the CWID.

11. The system as recited in claim 8, wherein four copies of H2 and H3 of each header are stored in four C1' codewords such that each of the four C1' codewords comprise the CWID.

12. The system as recited in claim 1, wherein unequal protection is provided to each header such that only a portion of each header is protected by C1' codewords, the portion including the CWID which is stored in a single C1' codeword.

13. The system as recited in claim 1, wherein the logic is further configured to calculate the ECC parity for at least one C1 codeword in each of the one or more rows, wherein the ECC parity is for a data portion of a C1 codeword and a portion of a header, and wherein the ECC parity comprises Reed-Solomon (RS) parity.

14. A method for integrating data and header protection, the method comprising:
   receiving a data array organized in rows and columns, each row of the data array comprising two or more interleaved C1 codewords (CWI); and
   modifying one or more rows of the data array to include a header and error correction code (ECC) parity to form one or more modified rows,
   wherein each modified row includes two or more interleaved codewords, at least one codeword being a C1' codeword which includes ECC parity,
   wherein each header comprises a CWI Designation (CWID) which indicates a location of the CWI within the data array, and
   wherein multiple copies of the CWID for each header are stored in a corresponding number of C1' codewords such that two or more C1' codewords comprise the CWID in a single modified row.

15. The method as recited in claim 14, wherein each header is 12 bytes in length (byte 0 to byte 11), and wherein each header comprises:
   an amble flag, an adjacent wrap toggle (AWT) field, and a data set identifier fragment (DSIF) stored in byte 0 (H0);
   an absolute codeword object set sequence number (ACN) stored in bytes 1 and 2 (H1 and H2);
   the CWID stored in bytes 2 and 3 (H2 and H3);
   reserved bits in bytes 4 and 5 (H4 and H5);
   a write pass identifier (WPI) stored in bytes 6, 7, 8, and 9 (H6, H7, H8, and H9); and
   header parity stored in bytes 10 and 11 (HA and HB),
   wherein H2 and H3 of each header are stored in a first C1' codeword such that the first C1' codeword comprises the CWID so that none of the CWIDs are split across multiple C1' codewords in a single modified row.

16. The method as recited in claim 15, wherein H4 and H5 are stored in a second C1' codeword such that the second C1' codeword comprises the reserved bits, and wherein H2 and H3 of each header are copied and stored in the reserved bits in H4 and H5.

17. The method as recited in claim 14, wherein each C1' codeword comprises the CWID or unequal protection is provided to each header such that only a portion of each header is protected by at least one C1' codeword, the portion including the CWID which is stored in a single C1' codeword.

18. The method as recited in claim 14, further comprising calculating the ECC parity for at least one C1 codeword in each of the one or more rows, wherein the ECC parity is for a data portion of a C1 codeword and a portion of a header.

19. A computer program product for integrating data and header protection, the computer program product comprising a computer readable storage medium having program code embodied therewith, the program code readable/executable by a storage device to:
   receive a data array organized in rows and columns, each row of the data array comprising two or more interleaved C1 codewords (CWI); and
   modify one or more rows of the data array to include a header and error correction code (ECC) parity to form one or more modified rows,
   wherein each modified row includes two or more interleaved codewords, at least one codeword being a C1' codeword which includes ECC parity,
   wherein each header comprises a CWI Designation (CWID) which indicates a location of the CWI within the data array, and
   wherein none of the CWIDs are split across multiple C1' codewords in a single modified row.

20. The computer program product as recited in claim 19, wherein each header is 12 bytes in length (byte 0 to byte 11), and wherein each header comprises:
   an amble flag, an adjacent wrap toggle (AWT) field, and a data set identifier fragment (DSIF) stored in byte 0 (H0);
   an absolute codeword object set sequence number (ACN) stored in bytes 1 and 2 (H1 and H2);
   the CWID stored in bytes 2 and 3 (H2 and H3);
   reserved bits in bytes 4 and 5 (H4 and H5);
   a write pass identifier (WPI) stored in bytes 6, 7, 8, and 9 (H6, H7, H8, and H9); and
   header parity stored in bytes 10 and 11 (HA and HB),
   wherein H2 and H3 of each header are stored in a first C1' codeword such that the first C1' codeword comprises the CWID,
   wherein each C1' codeword comprises the CWID or unequal protection is provided to each header such that only a portion of each header is protected by at least one C1' codeword, the portion including the CWID, and
   wherein multiple copies of the CWID for each header are stored in a corresponding number of C1' codewords such that two or more C1' codewords comprise the CWID.

* * * * *